US012649418B2

(12) United States Patent
Uken et al.

(10) Patent No.: US 12,649,418 B2
(45) Date of Patent: Jun. 9, 2026

(54) INTERIOR REARVIEW MIRROR ASSEMBLY FOR VEHICLE

(71) Applicant: MAGNA MIRRORS OF AMERICA, INC., Holland, MI (US)

(72) Inventors: John T. Uken, Jenison, MI (US); Mark L. Larson, Grand Haven, MI (US); Rodney K. Blank, Zeeland, MI (US); Joseph D. Suchecki, Grand Haven, MI (US); Craig Kendall, Grand Haven, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 52 days.

(21) Appl. No.: 18/738,314

(22) Filed: Jun. 10, 2024

(65) Prior Publication Data

US 2024/0343191 A1 Oct. 17, 2024

Related U.S. Application Data

(63) Continuation of application No. 18/048,883, filed on Oct. 24, 2022, now Pat. No. 12,005,840, which is a continuation of application No. 16/819,706, filed on Mar. 16, 2020, now Pat. No. 11,479,178, which is a continuation of application No. 16/173,072, filed on Oct. 29, 2018, now Pat. No. 10,589,684, which is a continuation of application No. 15/651,382, filed on (Continued)

(51) Int. Cl.
    *B60R 1/08* (2006.01)

(52) U.S. Cl.
    CPC .................................... *B60R 1/088* (2013.01)

(58) Field of Classification Search
    CPC ....................................................... B60R 1/088
    See application file for complete search history.

(56) References Cited

U.S. PATENT DOCUMENTS 1,949,138 A 2/1934 Bell
2,616,335 A 11/1952 Mazur
(Continued)

FOREIGN PATENT DOCUMENTS

CA 2028461 A1 8/1991
DE 2254511 A1 5/1974
(Continued)

*Primary Examiner* — Tuyen Tra
(74) *Attorney, Agent, or Firm* — HONIGMAN LLP

(57) ABSTRACT

A vehicular interior rearview mirror assembly includes a mirror head having a mirror casing and a mirror reflective element. The mirror casing includes a sidewall having an outer end region that circumscribes an open portion of the mirror casing. The mirror reflective element is disposed at the outer end region of the sidewall at the open portion of the mirror casing. The mirror reflective element includes at least a first glass substrate having a front surface and a rear surface and a substrate thickness spanning between the front surface of the first glass substrate and the rear surface of the first glass substrate. A circuit element is disposed within the mirror head. The circuit element includes a planar substrate having circuitry thereat. A plane of the planar substrate of the circuit element is non-parallel to a plane of the rear surface of the first glass substrate.

52 Claims, 27 Drawing Sheets

Related U.S. Application Data

Jul. 17, 2017, now Pat. No. 10,112,538, which is a continuation of application No. 14/929,494, filed on Nov. 2, 2015, now Pat. No. 9,707,895, which is a continuation of application No. 14/257,353, filed on Apr. 21, 2014, now Pat. No. 9,174,578.

(60) Provisional application No. 61/950,259, filed on Mar. 10, 2014, provisional application No. 61/875,350, filed on Sep. 9, 2013, provisional application No. 61/838,623, filed on Jun. 24, 2013, provisional application No. 61/823,647, filed on May 15, 2013, provisional application No. 61/814,535, filed on Apr. 22, 2013.

(56) References Cited

U.S. PATENT DOCUMENTS

| | | | |
|---|---|---|---|
| 2,962,933 A | 12/1960 | Hezler, Jr. | |
| 3,280,701 A | 10/1966 | Donnelly et al. | |
| 3,837,129 A | 9/1974 | Losell | |
| 4,435,042 A | 3/1984 | Wood et al. | |
| 4,436,371 A | 3/1984 | Wood et al. | |
| 4,530,571 A | 7/1985 | Connor | |
| 4,712,879 A | 12/1987 | Lynam et al. | |
| 4,826,289 A | 5/1989 | Vandenbrink et al. | |
| 4,882,466 A | 11/1989 | Friel | |
| 4,902,108 A | 2/1990 | Byker | |
| 4,948,242 A | 8/1990 | Desmond et al. | |
| 5,052,163 A | 10/1991 | Czekala | |
| 5,066,112 A | 11/1991 | Lynam et al. | |
| 5,069,535 A | 12/1991 | Baucke et al. | |
| 5,073,012 A | 12/1991 | Lynam | |
| 5,076,673 A | 12/1991 | Lynam et al. | |
| 5,115,346 A | 5/1992 | Lynam | |
| 5,140,455 A | 8/1992 | Varaprasad et al. | |
| 5,142,407 A | 8/1992 | Varaprasad et al. | |
| 5,151,816 A | 9/1992 | Varaprasad et al. | |
| 5,151,824 A | 9/1992 | O'Farrell | |
| 5,158,638 A | 10/1992 | Osanami et al. | |
| 5,179,471 A | 1/1993 | Caskey et al. | |
| 5,233,461 A | 8/1993 | Dornan et al. | |
| 5,253,109 A | 10/1993 | O'Farrell et al. | |
| 5,327,288 A | 7/1994 | Wellington | |
| 5,379,146 A | 1/1995 | Defendini | |
| 5,406,414 A | 4/1995 | O'Farrell et al. | |
| 5,421,940 A | 6/1995 | Cornils et al. | |
| 5,448,397 A | 9/1995 | Tonar | |
| 5,455,716 A | 10/1995 | Suman et al. | |
| 5,521,760 A | 5/1996 | De Young et al. | |
| 5,525,264 A | 6/1996 | Cronin et al. | |
| 5,530,240 A | 6/1996 | Larson et al. | |
| 5,550,677 A | 8/1996 | Schofield et al. | |
| 5,552,094 A | 9/1996 | Kubota | |
| 5,555,136 A | 9/1996 | Waldmann et al. | |
| 5,567,360 A | 10/1996 | Varaprasad et al. | |
| 5,575,552 A | 11/1996 | Faloon et al. | |
| 5,582,383 A | 12/1996 | Mertens et al. | |
| 5,610,756 A | 3/1997 | Lynam et al. | |
| 5,649,756 A | 7/1997 | Adams et al. | |
| 5,668,663 A | 9/1997 | Varaprasad et al. | |
| 5,669,698 A | 9/1997 | Veldman et al. | |
| 5,671,996 A | 9/1997 | Bos et al. | |
| 5,680,263 A | 10/1997 | Zimmermann et al. | |
| 5,724,187 A | 3/1998 | Varaprasad et al. | |
| 5,725,957 A | 3/1998 | Varaprasad et al. | |
| 5,790,298 A | 8/1998 | Tonar | |
| 5,796,094 A | 8/1998 | Schofield et al. | |
| 5,808,777 A | 9/1998 | Lynam et al. | |
| 5,808,778 A | 9/1998 | Bauer et al. | |
| 5,818,625 A | 10/1998 | Forgette et al. | |
| 5,877,897 A | 3/1999 | Schofield et al. | |
| 5,910,854 A | 6/1999 | Varaprasad et al. | |
| 5,923,457 A | 7/1999 | Byker et al. | |
| 5,984,482 A | 11/1999 | Rumsey et al. | |
| 5,985,184 A | 11/1999 | Lynam | |
| 6,002,511 A | 12/1999 | Varaprasad et al. | |
| 6,064,508 A | 5/2000 | Forgette et al. | |
| 6,068,380 A | 5/2000 | Lynn et al. | |
| 6,102,546 A | 8/2000 | Carter | |
| 6,111,683 A | 8/2000 | Cammenga et al. | |
| 6,124,886 A | 9/2000 | DeLine et al. | |
| 6,154,306 A | 11/2000 | Varaprasad et al. | |
| 6,166,848 A | 12/2000 | Cammenga et al. | |
| 6,170,956 B1 | 1/2001 | Rumsey et al. | |
| 6,178,034 B1 | 1/2001 | Allemand et al. | |
| 6,193,379 B1 | 2/2001 | Tonar et al. | |
| 6,195,194 B1 | 2/2001 | Roberts et al. | |
| 6,227,675 B1 | 5/2001 | Mertens et al. | |
| 6,239,899 B1 | 5/2001 | DeVries et al. | |
| 6,249,369 B1 | 6/2001 | Theiste et al. | |
| 6,297,900 B1 | 10/2001 | Tulloch et al. | |
| 6,315,421 B1 | 11/2001 | Apfelbeck et al. | |
| 6,317,248 B1 | 11/2001 | Agrawal et al. | |
| 6,318,870 B1 | 11/2001 | Spooner et al. | |
| 6,329,925 B1 | 12/2001 | Skiver et al. | |
| 6,331,066 B1 | 12/2001 | Desmond et al. | |
| 6,356,376 B1 | 3/2002 | Tonar et al. | |
| 6,369,804 B1 | 4/2002 | Sandbach | |
| 6,396,397 B1 | 5/2002 | Bos et al. | |
| 6,407,468 B1 | 6/2002 | LeVesque et al. | |
| 6,407,847 B1 | 6/2002 | Poll et al. | |
| 6,439,755 B1 | 8/2002 | Fant, Jr. et al. | |
| 6,449,082 B1 | 9/2002 | Agrawal et al. | |
| 6,452,479 B1 | 9/2002 | Sandbach | |
| 6,499,850 B2 | 12/2002 | Waldmann | |
| 6,502,970 B1 | 1/2003 | Anderson et al. | |
| 6,535,126 B2 | 3/2003 | Lin et al. | |
| 6,598,980 B2 | 7/2003 | Marusawa et al. | |
| 6,606,183 B2 | 8/2003 | Ikai et al. | |
| 6,606,184 B2 | 8/2003 | Guarr et al. | |
| 6,614,579 B2 | 9/2003 | Roberts et al. | |
| 6,619,955 B2 | 9/2003 | Cardarelli | |
| 6,650,457 B2 | 11/2003 | Busscher et al. | |
| 6,665,107 B2 | 12/2003 | Forgette et al. | |
| 6,690,268 B2 | 2/2004 | Schofield et al. | |
| D493,131 S | 7/2004 | Lawlor et al. | |
| D493,394 S | 7/2004 | Lawlor et al. | |
| 6,774,810 B2 | 8/2004 | DeLine et al. | |
| 6,781,738 B2 | 8/2004 | Kikuchi et al. | |
| 6,870,656 B2 | 3/2005 | Tonar et al. | |
| 7,004,592 B2 | 2/2006 | Varaprasad et al. | |
| 7,004,593 B2 | 2/2006 | Weller et al. | |
| 7,012,729 B2 | 3/2006 | Tonazzi et al. | |
| 7,042,616 B2 | 5/2006 | Tonar et al. | |
| 7,064,882 B2 | 6/2006 | Tonar et al. | |
| 7,093,965 B2 | 8/2006 | Veldman | |
| 7,110,156 B2 | 9/2006 | Lawlor et al. | |
| 7,184,190 B2 | 2/2007 | McCabe et al. | |
| 7,195,381 B2 | 3/2007 | Lynam et al. | |
| 7,202,987 B2 | 4/2007 | Varaprasad et al. | |
| 7,224,324 B2 | 5/2007 | Quist et al. | |
| 7,249,860 B2 | 7/2007 | Kulas et al. | |
| 7,253,723 B2 | 8/2007 | Lindahl et al. | |
| 7,255,451 B2 | 8/2007 | McCabe et al. | |
| 7,256,923 B2 | 8/2007 | Liu et al. | |
| 7,274,501 B2 | 9/2007 | McCabe et al. | |
| 7,287,868 B2 | 10/2007 | Carter et al. | |
| 7,289,037 B2 | 10/2007 | Uken et al. | |
| 7,310,177 B2 | 12/2007 | McCabe et al. | |
| 7,310,178 B2 | 12/2007 | Lawlor et al. | |
| 7,324,261 B2 | 1/2008 | Tonar et al. | |
| 7,329,013 B2 | 2/2008 | Blank et al. | |
| 7,338,177 B2 | 3/2008 | Lynam | |
| 7,349,144 B2 | 3/2008 | Varaprasad et al. | |
| 7,355,161 B2 | 4/2008 | Romig et al. | |
| 7,360,932 B2 | 4/2008 | Uken et al. | |
| 7,370,983 B2 | 5/2008 | DeWind et al. | |
| 7,372,611 B2 | 5/2008 | Tonar et al. | |
| 7,400,435 B2 | 7/2008 | Byers et al. | |
| 7,420,756 B2 | 9/2008 | Lynam | |
| 7,446,924 B2 | 11/2008 | Schofield et al. | |
| 7,467,883 B2 | 12/2008 | DeLine et al. | |

(56) References Cited

U.S. PATENT DOCUMENTS

| | | | |
|---|---|---|---|
| 7,490,944 | B2 * | 2/2009 | Blank .................. G01C 17/38 |
| | | | 359/838 |
| 7,510,311 | B2 | 3/2009 | Romas et al. |
| 7,526,367 | B2 | 4/2009 | Schofield et al. |
| 7,532,149 | B2 | 5/2009 | Banko et al. |
| 7,542,193 | B2 | 6/2009 | McCabe et al. |
| 7,570,413 | B2 | 8/2009 | Tonar et al. |
| 7,599,108 | B2 | 10/2009 | Lawlor et al. |
| 7,602,542 | B2 | 10/2009 | Tonar et al. |
| 7,612,929 | B2 | 11/2009 | Tonar et al. |
| 7,626,749 | B2 | 12/2009 | Baur et al. |
| 7,663,798 | B2 | 2/2010 | Tonar et al. |
| 7,706,046 | B2 | 4/2010 | Bauer et al. |
| 7,710,631 | B2 | 5/2010 | McCabe et al. |
| 7,719,750 | B2 | 5/2010 | Tonar et al. |
| 7,817,020 | B2 | 10/2010 | Turnbull et al. |
| 7,821,697 | B2 | 10/2010 | Varaprasad et al. |
| 7,826,123 | B2 | 11/2010 | McCabe et al. |
| 7,830,583 | B2 | 11/2010 | Neuman et al. |
| 7,855,755 | B2 | 12/2010 | Weller et al. |
| 7,864,398 | B2 | 1/2011 | Dozeman et al. |
| 7,864,399 | B2 | 1/2011 | McCabe et al. |
| D633,019 | S | 2/2011 | De Wind |
| D633,423 | S | 3/2011 | De Wind |
| 7,922,199 | B2 | 4/2011 | Webber et al. |
| 7,926,960 | B2 | 4/2011 | Skiver et al. |
| D638,761 | S | 5/2011 | De Wind |
| 7,978,094 | B2 | 7/2011 | Uken et al. |
| 7,980,711 | B2 | 7/2011 | Takayanagi et al. |
| 8,004,741 | B2 | 8/2011 | Tonar et al. |
| 8,018,440 | B2 | 9/2011 | Townsend et al. |
| D647,017 | S | 10/2011 | De Wind |
| 8,035,881 | B2 | 10/2011 | Luten et al. |
| 8,047,667 | B2 | 11/2011 | Weller et al. |
| 8,048,085 | B2 | 11/2011 | Peterson et al. |
| 8,049,640 | B2 | 11/2011 | Uken et al. |
| 8,154,418 | B2 | 4/2012 | Peterson et al. |
| D660,208 | S | 5/2012 | De Wind |
| 8,169,684 | B2 | 5/2012 | Bugno et al. |
| 8,179,586 | B2 | 5/2012 | Schofield et al. |
| D661,234 | S | 6/2012 | De Wind |
| 8,194,133 | B2 | 6/2012 | DeWind et al. |
| 8,237,909 | B2 | 8/2012 | Ostreko et al. |
| 8,277,059 | B2 | 10/2012 | McCabe et al. |
| 8,335,032 | B2 | 12/2012 | McCabe et al. |
| 8,339,526 | B2 | 12/2012 | Minikey, Jr. et al. |
| 8,465,161 | B2 | 6/2013 | DeWind et al. |
| 8,503,061 | B2 | 8/2013 | Uken et al. |
| 8,508,831 | B2 | 8/2013 | De Wind et al. |
| 8,730,553 | B2 | 5/2014 | De Wind et al. |
| 9,134,585 | B2 | 9/2015 | Tonar et al. |
| 9,174,578 | B2 | 11/2015 | Uken et al. |
| 9,346,402 | B2 | 5/2016 | Tonar et al. |
| 9,481,303 | B2 | 11/2016 | De Wind et al. |
| 9,545,882 | B2 | 1/2017 | Lock et al. |
| 9,707,895 | B2 | 7/2017 | Uken et al. |
| 9,783,115 | B2 | 10/2017 | Uken et al. |
| 9,827,913 | B2 | 11/2017 | De Wind et al. |
| 10,112,538 | B2 | 10/2018 | Uken et al. |
| 10,589,684 | B2 | 3/2020 | Uken et al. |
| 11,479,178 | B2 | 10/2022 | Uken et al. |
| 12,005,840 | B2 | 6/2024 | Uken et al. |
| 2002/0057494 | A1 | 5/2002 | Lang |
| 2003/0007261 | A1 | 1/2003 | Hutzel et al. |
| 2005/0007645 | A1 | 1/2005 | Tonar et al. |
| 2005/0281043 | A1 | 12/2005 | Eisenbraun |
| 2006/0050018 | A1 | 3/2006 | Hutzel et al. |
| 2006/0061008 | A1 | 3/2006 | Karner et al. |
| 2007/0081350 | A1 | 4/2007 | Huang |
| 2007/0139751 | A1 | 6/2007 | Kuiper et al. |
| 2008/0042938 | A1 | 2/2008 | Cok |
| 2008/0291523 | A1 | 11/2008 | Tonar et al. |
| 2009/0213480 | A1 | 8/2009 | Li |
| 2009/0237821 | A1 | 9/2009 | Li |
| 2009/0243824 | A1 | 10/2009 | Peterson et al. |
| 2009/0251785 | A1 | 10/2009 | Bruhnke et al. |
| 2009/0251913 | A1 | 10/2009 | Bruhnke et al. |
| 2010/0177413 | A1 | 7/2010 | Lee et al. |
| 2010/0290141 | A1 | 11/2010 | Huang |
| 2010/0321758 | A1 | 12/2010 | Bugno et al. |
| 2011/0176323 | A1 | 7/2011 | Skiver et al. |
| 2011/0188122 | A1 | 8/2011 | Habibi et al. |
| 2011/0317242 | A1 | 12/2011 | Tonar et al. |
| 2012/0026571 | A1 | 2/2012 | Uken et al. |
| 2012/0038964 | A1 | 2/2012 | De Wind et al. |
| 2012/0236388 | A1 | 9/2012 | De Wind et al. |
| 2013/0112679 | A1 | 5/2013 | Van Wyhe et al. |
| 2014/0022390 | A1 | 1/2014 | Blank et al. |
| 2014/0036338 | A1 | 2/2014 | Bareman et al. |
| 2014/0133044 | A1 | 5/2014 | Mambourg |
| 2014/0293169 | A1 | 10/2014 | Uken et al. |
| 2015/0085337 | A1 | 3/2015 | Lee et al. |
| 2017/0043721 | A1 | 2/2017 | De Wind et al. |
| 2017/0232899 | A1 | 8/2017 | De Wind et al. |
| 2017/0355312 | A1 | 12/2017 | Habibi et al. |
| 2018/0257571 | A1 | 9/2018 | De Wind et al. |

FOREIGN PATENT DOCUMENTS

| | | | |
|---|---|---|---|
| DE | 2362191 | A1 | 6/1975 |
| DE | 3049169 | A1 | 7/1982 |
| EP | 0744321 | A2 | 11/1996 |
| EP | 1103420 | A2 | 5/2001 |
| EP | 1345071 | A1 | 9/2003 |
| EP | 2106970 | A1 | 10/2009 |
| FR | 1525709 | A | 5/1968 |
| GB | 2161440 | A | 1/1986 |
| WO | 2001001192 | A1 | 1/2001 |
| WO | 2003004245 | A1 | 1/2003 |
| WO | WO-03099614 | A1 * | 12/2003 ............... B60R 1/12 |
| WO | 2004026633 | A2 | 4/2004 |
| WO | 2004031840 | A2 | 4/2004 |
| WO | 2004042457 | A2 | 5/2004 |
| WO | 2005096069 | A1 | 10/2005 |
| WO | 2008013499 | A1 | 1/2008 |
| WO | 2010124064 | A1 | 10/2010 |
| WO | 2011044312 | A1 | 4/2011 |
| WO | 20120006422 | A1 | 1/2012 |
| WO | 2012051500 | A1 | 4/2012 |
| WO | 2013071070 | A1 | 5/2013 |

* cited by examiner

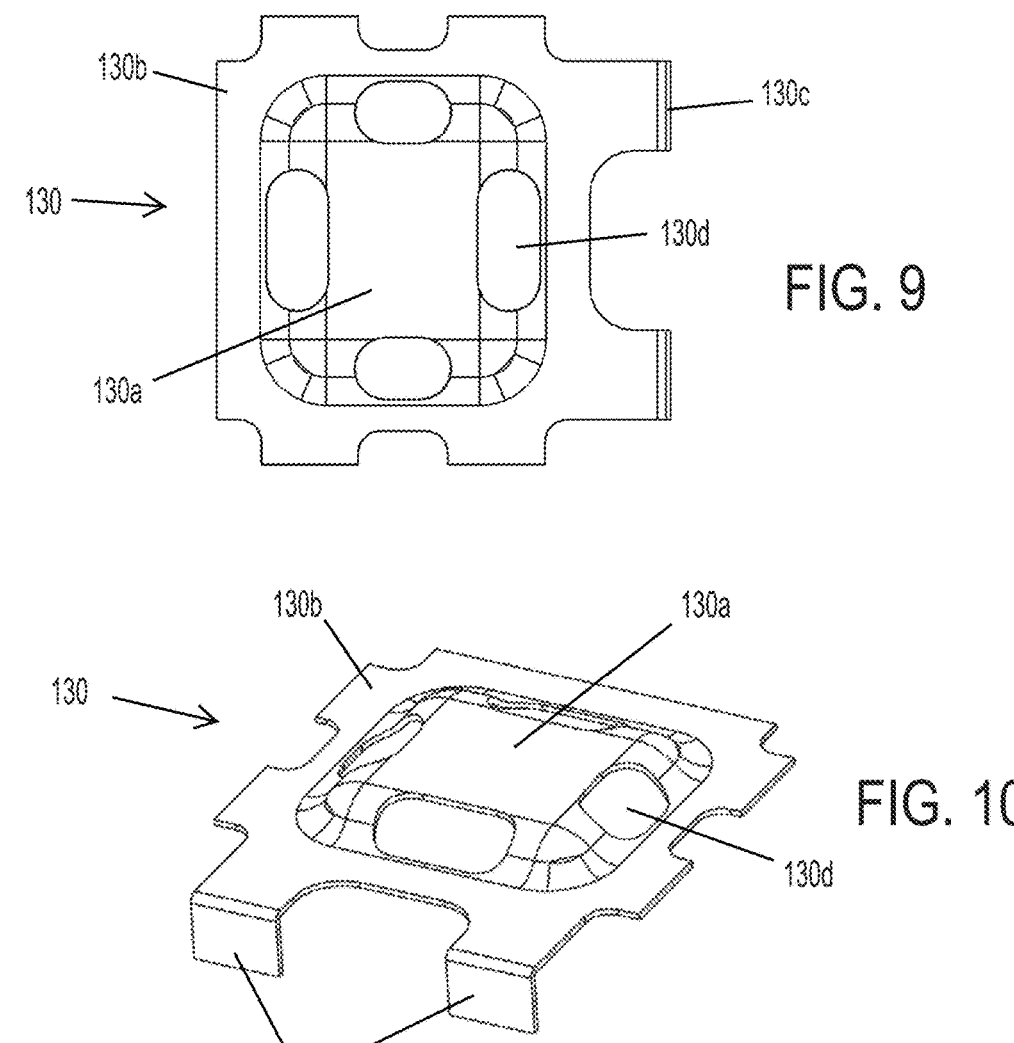
FIG. 9
FIG. 10
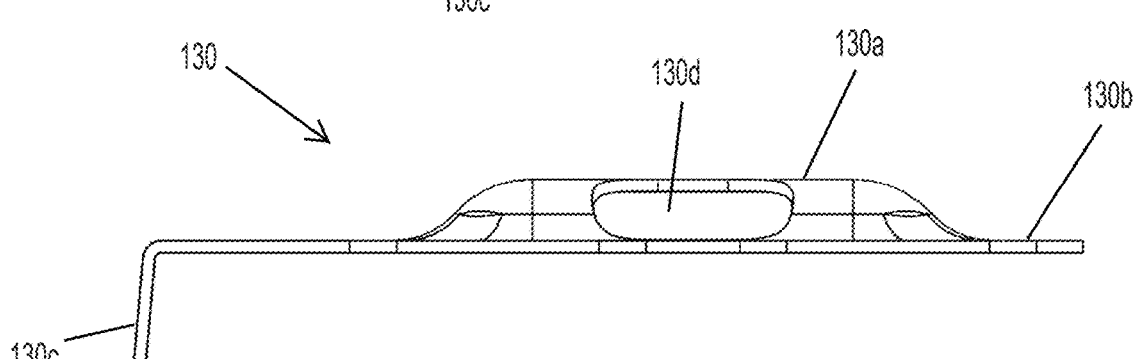
FIG. 11

| All dims in mm | Width | Height |
|---|---|---|
| Overall Size | 243.9 | 63.0 |
| Usable reflective area | 238.4 | 57.5 |
| Dimming area | 231.9 | 51.0 |

FLUSH HOUSING TO GLASS (EC CELL OR PRISM OR FLAT GLASS)

0.0 ALL AROUND 414    420a

THIS INTERFACE BETWEEN THE ATTACHMENT PLATE AND THE HOUSING CONTROLS THE FIT OF THE HOUSING TO THE GLASS EDGE.

420

Certain areas, where cutouts are required, may be strengthened to prevent looseness or "squishy" feel Continuous surface to maintain Housing support all around Height Length

| All dims in mm | Width | Height |
|---|---|---|
| Overall Size | 243.9 | 63.0 |
| Usable reflective area | 238.7 | 57.8 |
| Dimming area | 227.0 | 48.5 |

Electron Microscope Images

Polished edge (x700)

Frosted edge (x700)

Original Contaminant Application

After Dry Wipe With Cloth

After Water and Cloth Wipe

INTERIOR REARVIEW MIRROR ASSEMBLY FOR VEHICLE

CROSS REFERENCE TO RELATED APPLICATIONS

The present application is a continuation of U.S. patent application Ser. No. 18/048,883, filed Oct. 24, 2022, now U.S. Pat. No. 12,005,840, which is a continuation of U.S. patent application Ser. No. 16/819,706, filed Mar. 16, 2020, now U.S. Pat. No. 11,479,178, which is a continuation of U.S. patent application Ser. No. 16/173,072, filed Oct. 29, 2018, now U.S. Pat. No. 10,589,684, which is a continuation of U.S. patent application Ser. No. 15/651,382, filed Jul. 17, 2017, now U.S. Pat. No. 10,112,538, which is a continuation of U.S. patent application Ser. No. 14/929,494, filed Nov. 2, 2015, now U.S. Pat. No. 9,707,895, which is a continuation of U.S. patent application Ser. No. 14/257,353, filed Apr. 21, 2014, now U.S. Pat. No. 9,174,578, which claims the filing benefits of U.S. provisional applications, Ser. No. 61/950,259, filed Mar. 10, 2014, Ser. No. 61/875,350, filed Sep. 9, 2013, Ser. No. 61/838,623, filed Jun. 24, 2013, Ser. No. 61/823,647, filed May 15, 2013, and Ser. No. 61/814,535, filed Apr. 22, 2013, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a variable reflectance mirror reflective element for an interior or exterior rearview mirror assembly of a vehicle. The mirror reflective element is electrically powered via electrical leads that are soldered or clipped at an electrical conductor at the mirror reflective element, such as via clipping onto respective edge regions of the front and rear substrates to electrically contact the conductive coating or coatings at the rear of the front substrate and at the front and/or rear of the rear substrate. The mirror reflective element is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

The present invention provides an interior rearview mirror assembly that has a variable reflectance electro-optic mirror reflective element with enhanced or improved electrical connectors established at the rear of the reflective element and in electrical connection with the conductive coating or coatings at the rear of the front substrate and at the front and/or rear of the rear substrate. The mirror reflective element may be disposed at a mirror casing that may house one or more electronic accessories. A circuit element or board and accessories and/or circuitry disposed thereon may be angled within the mirror casing and not parallel to the rear of the reflective element to provide enhanced clearance for the electrical content within the mirror casing.

These and other objects, advantages, purposes and features of the present invention will become apparent upon review of the following specification in conjunction with the drawings.

BRIEF DESCRIPTION OF THE DRAWINGS

FIG. 9 is a perspective view of another electrical connector configured to attach at a rear surface of a mirror reflective element and have a wire or lead soldered thereto, in accordance with the present invention;

FIG. 10 is a plan view of the electrical connector of FIG. 9;

FIG. 11 is a side elevation of the electrical connector of FIG. 9;

DESCRIPTION OF THE PREFERRED EMBODIMENTS

Figure 1:
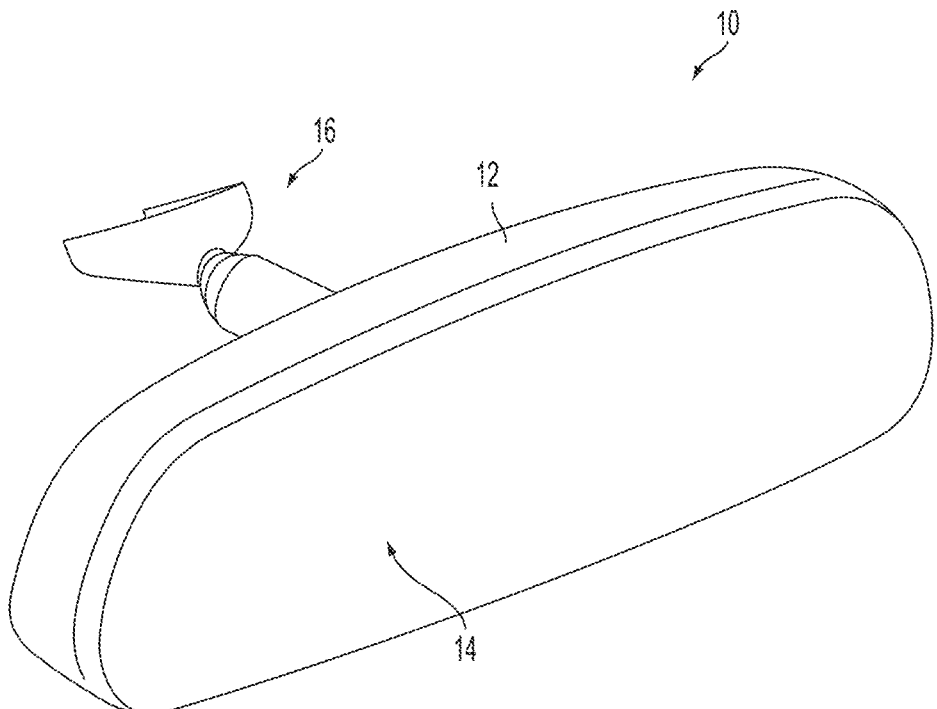
FIG. 1 is a perspective view of an interior rearview mirror assembly in accordance with the present invention.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a variable reflectance mirror reflective element that varies its reflectance responsive to electrical current applied to conductive coatings or layers of the reflective element. The electrical current is applied via electrical connectors disposed at the rear of the mirror reflective element, as discussed below.

Figure 1A:
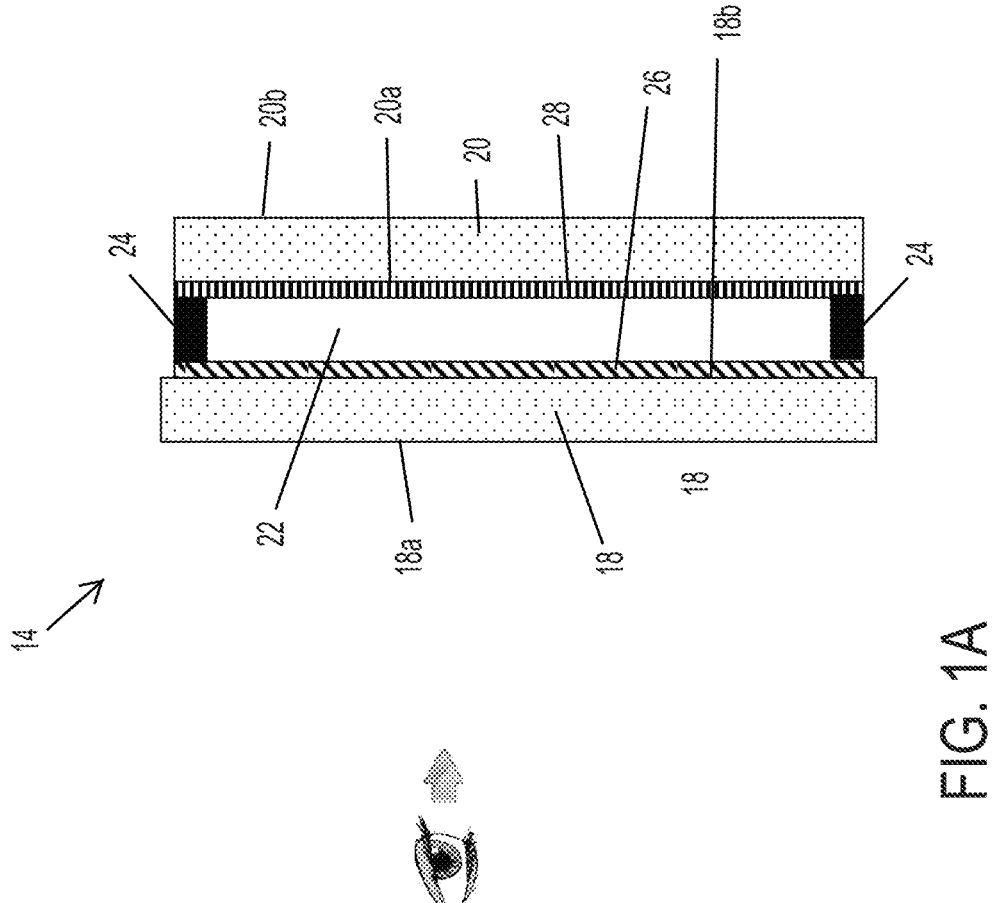
FIG. 1A is a sectional view of the mirror reflective element of the mirror assembly of FIG. 1.

In the illustrated embodiment, and as shown in FIG. 1A, the mirror reflective element 14 comprises a laminate construction variable reflectance electro-optic (such as electrochromic) reflective element assembly having a front substrate 18 and a rear substrate 20 with an electro-optic medium 22 (such as electrochromic medium) sandwiched therebetween and bounded by a perimeter seal 24. As shown in FIG. 1A, front substrate 18 has a front or first surface 18a (the surface that generally faces the driver of a vehicle when the mirror assembly is normally mounted at the vehicle) and a rear or second surface 18b opposite the front surface 18a, and rear substrate 20 has a front or third surface 20a and a rear or fourth surface 20b opposite the front surface 20a, with the electro-optic medium 22 disposed between the second surface 18b and the third surface 20a and bounded by the perimeter seal 24 of the reflective element (such as is known in the electrochromic mirror art). The second surface 18a has a transparent conductive coating 26 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 20a has a metallic reflector coating 28 (or multiple layers or coatings) established thereat. The front or third surface 20a of rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The third surface 20a defines the active EC area or surface of the rear substrate within the perimeter seal 24. The coated third surface 20a may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and/or 6,449,082, which are hereby incorporated herein by reference in their entireties.

Figure 2:
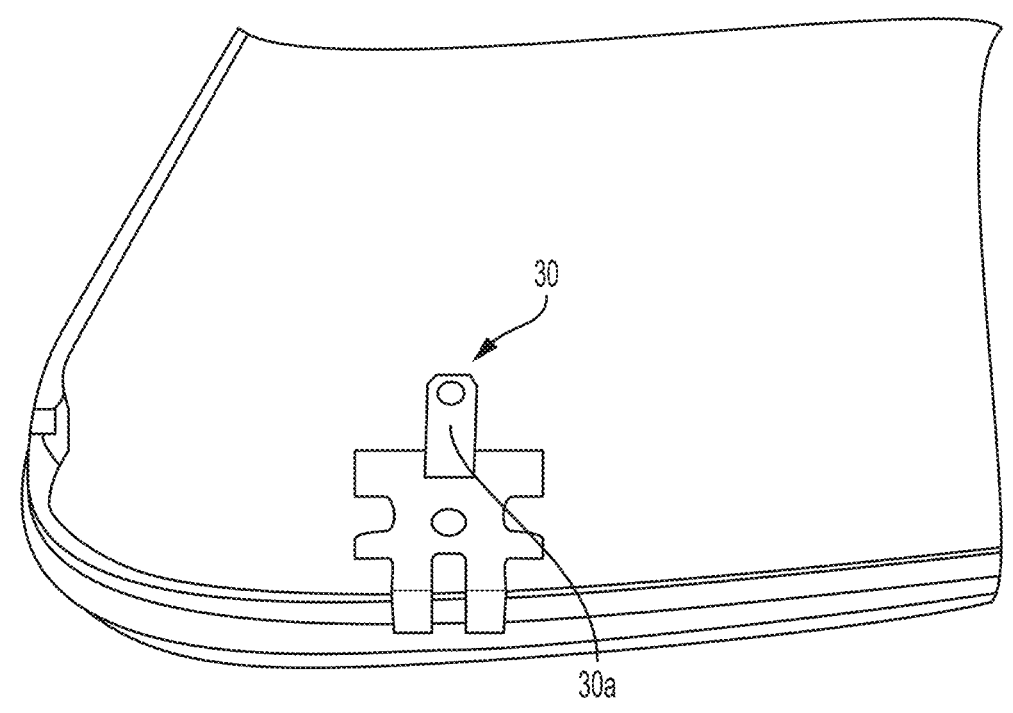
FIG. 2 is a perspective view of a rear portion of a mirror reflective element with an electrical connector established thereat for electrically connecting a wire or lead to an electrically conductive coating or layer at a surface of the mirror reflective element.
Figure 3:
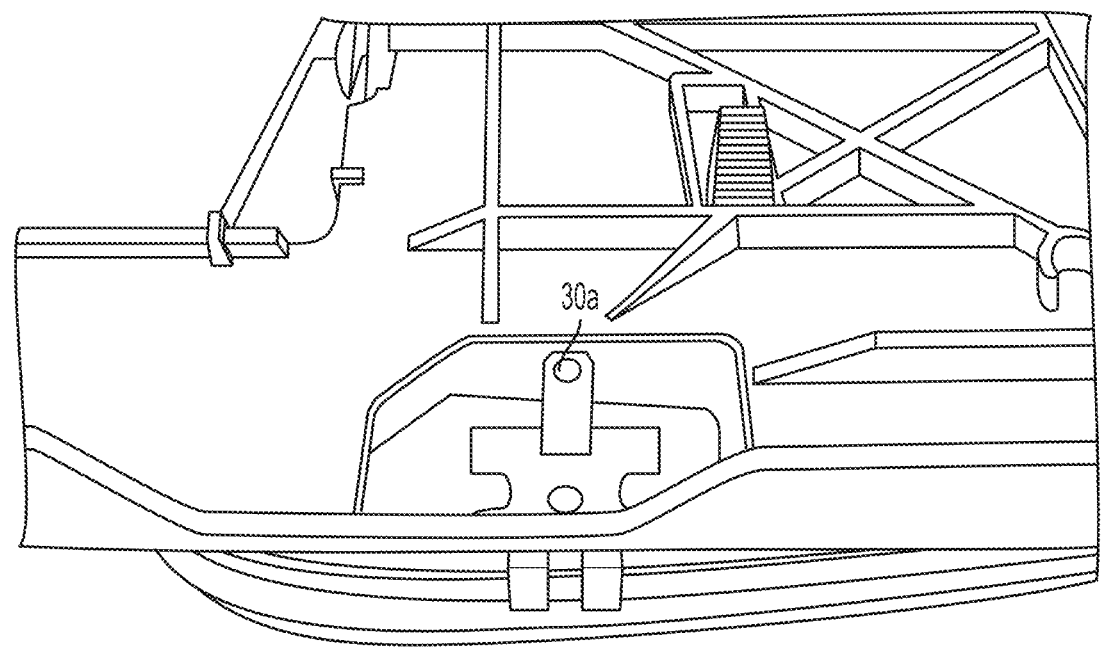
FIG. 3 is another perspective view of the rear portion of the mirror reflective element of FIG. 2, with a backplate attached thereat and with a tab of the electrical connector protruding through an aperture formed at the backplate.
Figure 4:
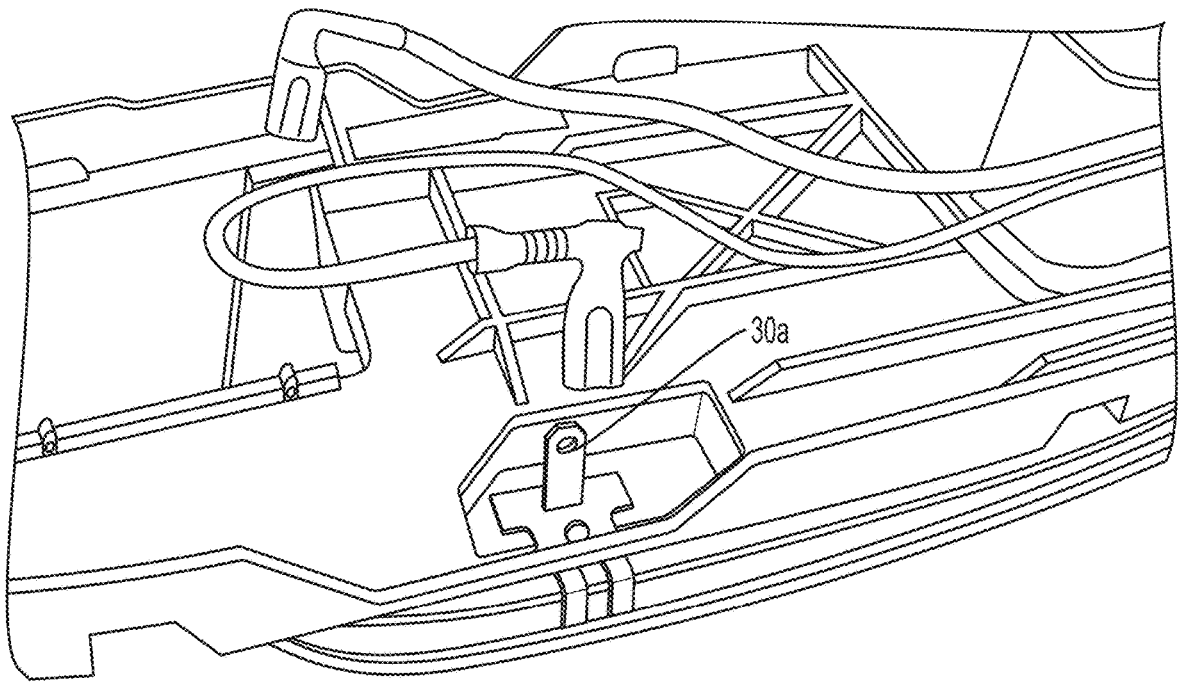
FIG. 4 is another perspective view of the rear portion of the mirror reflective element of FIG. 3, with a wire or lead for connecting to the tab of the electrical connector protruding through an aperture formed at the backplate.
Figure 5:
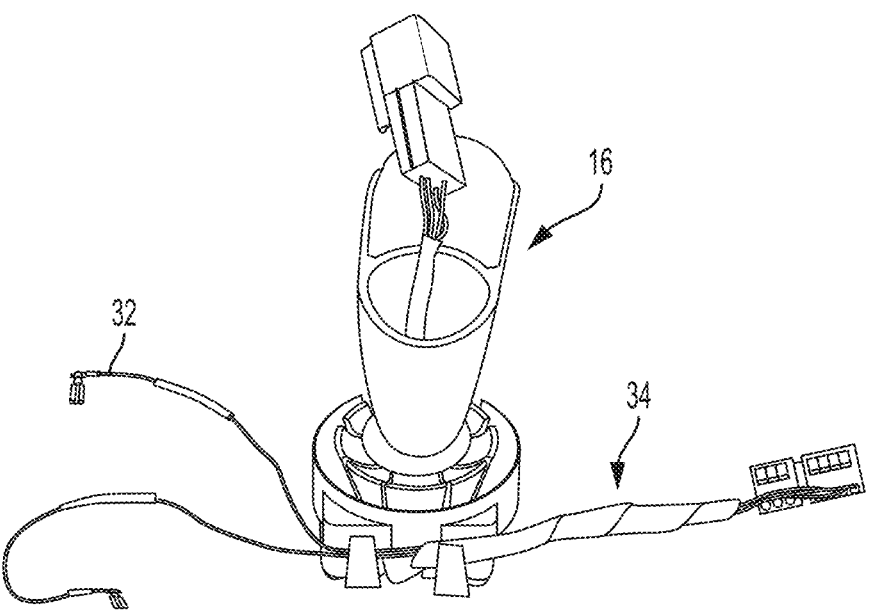
FIGS. 5-8 are perspective views of electrical leads and wires and connectors of a mirror wiring harness that may be received in the mirror head via a mounting structure of the mirror assembly.
Figure 6:
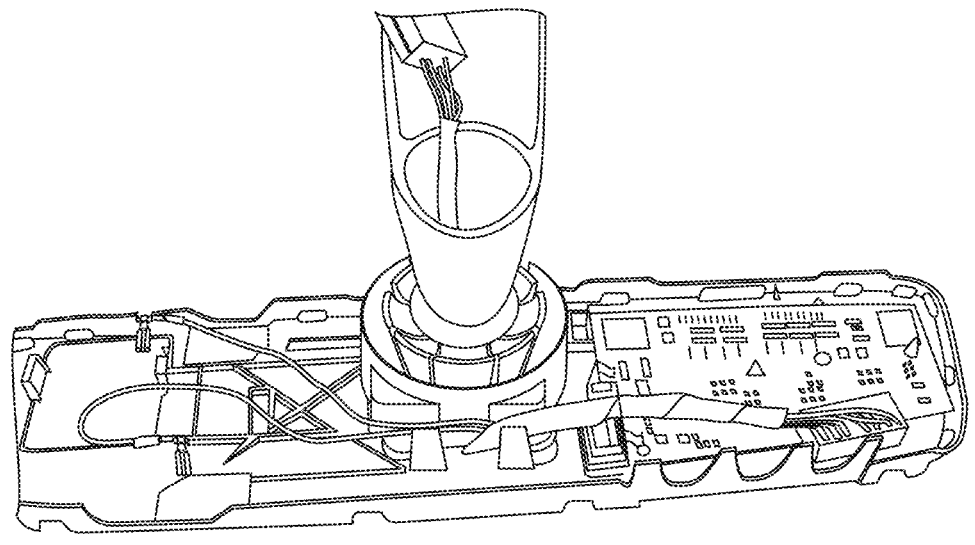
Figure 7:
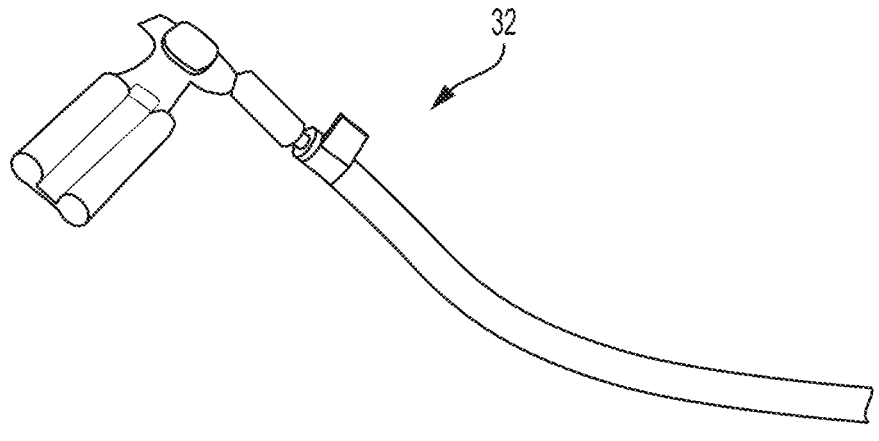
Figure 8:
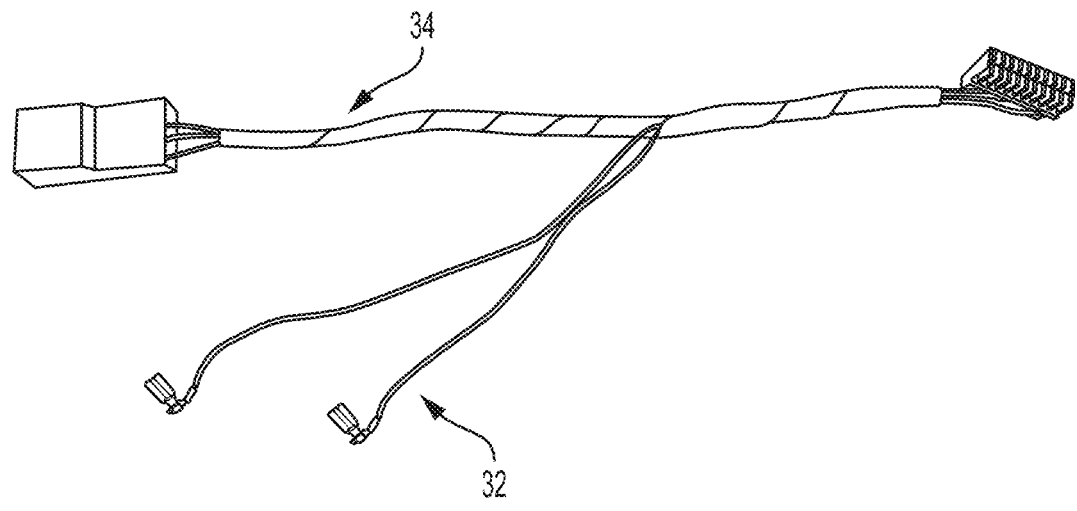

As shown in FIGS. 2-4, the mirror reflective element 10 includes a pair of electrical connectors 30 disposed at the rear surface 20b of the rear substrate 20 and having a tab or connector portion 30a protruding rearward therefrom. Although only one connector 30 is shown in FIGS. 2-4, the reflective element would have two connectors, one connector that is in electrical connection with the transparent conductive layer or coating at the second surface or rear surface of the front substrate and another connector that is in electrical connection with the conductive layer or coating at the third surface or front surface of the rear substrate. The connectors 30 may be adhered or otherwise attached at the rear surface of the reflective element (such as via a conductive or non-conductive epoxy or the like), with tabs 30b that wrap around an edge portion of the rear substrate to electrically connect with a busbar or connecting portion or tab of the respective conductive coating or layer at the front or rear substrate. As best shown in FIG. 4, an electrical lead or wire 32 may electrically connect to the connector portion 30a of the connector to electrically connect a wire harness 34 to the electrically conductive coatings or layers of the mirror reflective element. The leads 32 may receive the connector portion in a respective connector and may crimp or tightly receive and contact the connector portion to establish electrical connection to the connectors 30. As shown in FIGS. 5-8, the leads 32 may be part of a wire harness 34 that includes electrical wires for connecting to circuitry of a circuit board of the mirror assembly and that may be routed through the mounting assembly or structure 16 of the mirror assembly 10.

Thus, a male spade-type post is mechanically attached at the glass surface and electrically connected to the respective electrically conductive coating or layer at a glass surface of the reflective element. A female terminal is crimped to the mirror harness wires or leads and is configured to receive the post therein to connect the wire or lead to the connector. The control voltage (+and −) for controlling or powering the electro-optic mirror reflective element or cell is routed from the printed circuit board (PCB) connector and through the wire harness. The electrical connections may utilize aspects of the mirror assemblies described in U.S. Pat. Nos. 5,066, 112; 5,668,663; 5,724, 187; 6,002,511 and/or 8,503,061, which are hereby incorporated herein by reference in their entireties.

Although shown and described as having a connecting portion or tab for electrically connecting to the wire or lead, the electrical connector may have an end of the wire or lead soldered or spot welded or resistance welded to the connector to establish the electrical connection. For example, and with reference to FIGS. 9-11, an electrical connector 130 may have a solder pad or attachment pad 130a that is raised from or above an attaching portion 130b (that is attached at the rear surface of the reflective element, such as via a conductive or non-conductive epoxy or the like), so that the solder pad 130a (where the wire is soldered and which is substantially heated during the soldering process) is spaced from the rear glass surface of the rear substrate of the reflective element. The connector 130 includes tabs 130c that wrap around a perimeter edge region of the rear substrate to electrically connect with a busbar or connecting portion or tab of the respective conductive coating or layer at the front or rear substrate.

To improve reliability, it may be desirable to solder or spot weld or the like the wire or lead to the connector attached at the rear of the reflective element. However, a concern with soldering (especially lead-free) is that it results is substantial heat at or directly on the reflective element or cell and the conductive epoxy and ultra-violet (UV) glue. The connector of the present invention addresses the heat issue by having a raised center soldering or welding pad or zone that provides an air gap between the connector's attachment zone or pad and the glass surface of the rear substrate. Optionally, and as shown in FIGS. 9-11, the connector 130 includes punched holes or apertures 130d generally around the attachment pad or zone 130a to reduce the thermal transfer from the solder zone or attachment zone to the adhesion perimeter zone or attaching portion 130b. In the illustrated embodiment, the connector attaching portion 130b substantially or entirely circumscribes or surrounds the wire attaching portion or zone or pad to provide adhesion or attachment of the connector at the glass substrate substantially or entirely around the wire attaching zone or pad.

Thus, the connector of the present invention allows for direct soldering or spot welding of the ends of the wires or leads to the connector, while reducing the heat at the glass surface at which the connector is attached. The present invention thus provides a raised soldering platform or pad that is removed from or away from the glass surface to minimize heating of the glass substrate during the wire attaching (such as soldering or spot welding or the like) process. The present invention thus minimizes thermal paths out from solder pad area to minimize heating of the glass substrate at which the connector is adhered or bonded or otherwise attached. The connector may comprise any suitable material and may be formed via any suitable forming process. For example, the connector may comprise a stamped metallic connector or the like.

Figures 12, 13, 14:
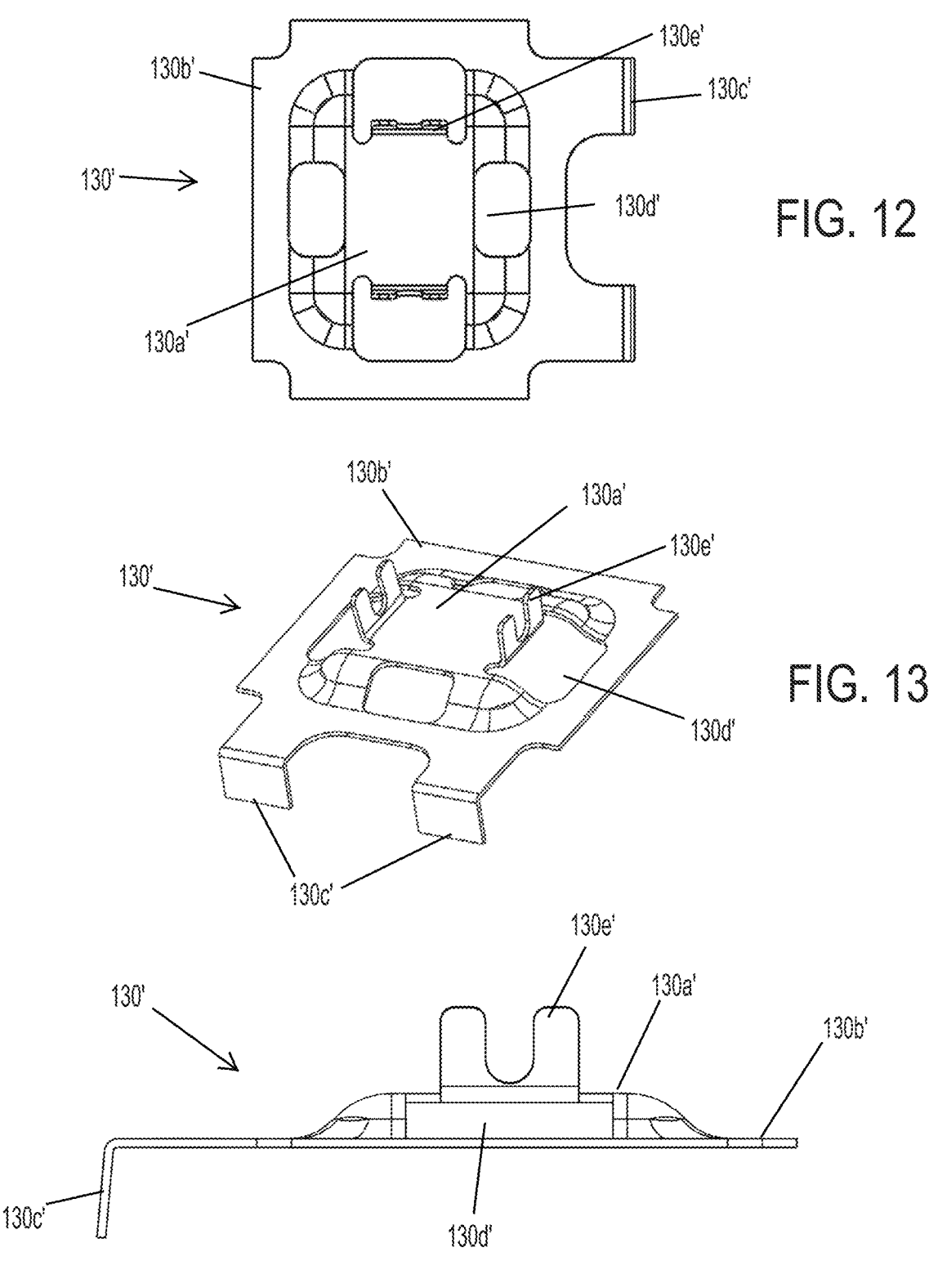
FIG. 12 is a perspective view of another electrical connector configured to attach at a rear surface of a mirror reflective element and have a wire or lead soldered thereto, in accordance with the present invention.
FIG. 13 is a plan view of the electrical connector of FIG. 12.
FIG. 14 is a side elevation of the electrical connector of FIG. 12.

Optionally, and with reference to FIGS. 12-14, a connector 130' may include wire holders or "goal posts" 130e' formed at and protruding outward from the attachment or soldering or welding pad or zone 130a' and away from the mirror reflective element when the attaching portion 130b' of the connector is attached or adhered or bonded at the rear surface of the rear substrate of the reflective element, with the tabs 130c' extending or wrapping over a portion of the perimeter edge of the rear substrate. The wire holders are configured to hold the wire in position during the soldering process that attaches or solders or welds the wire to the soldering pad. The wire holders may be sized with an appropriate width channel or receptacle to snugly or tightly receive the bare wire end therein to substantially hold the wire during the soldering process (or the channel may be sized larger than the wire gauge to generally or loosely hold the wire therein). The wire holders 130e' may be formed during the stamping or forming of the connector (and may comprise a portion of the metallic element that otherwise would be removed to form the apertures 130d'), and are preferably integrally formed with the metallic stamped connector. The connector may comprise any suitable material, such as, for example, tin plated Beryllium Copper or the like. The connector 130' may otherwise be similar to connector 130, discussed above, such that a detailed discussion of the connectors need not be repeated herein.

Figure 15:
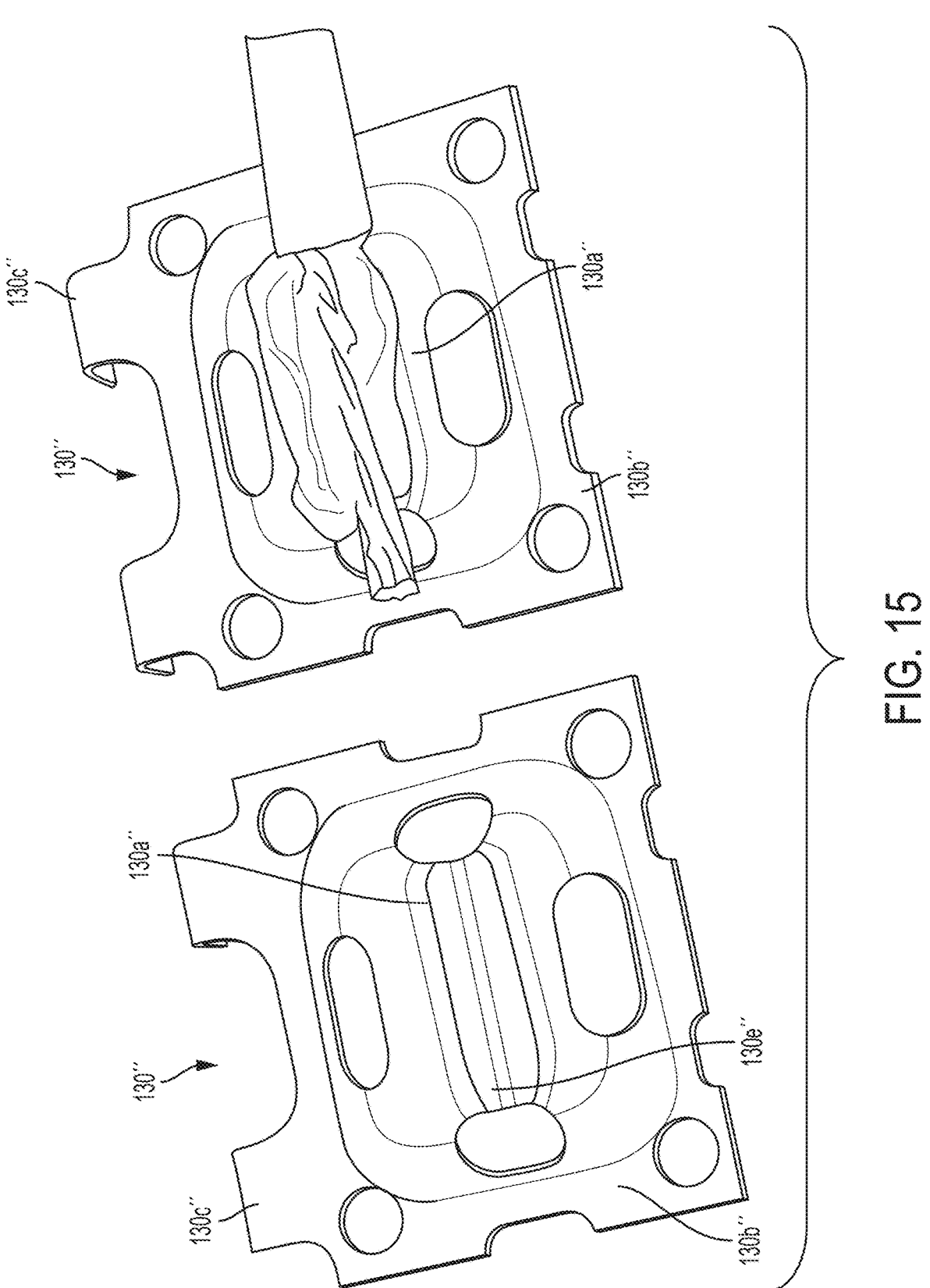
FIG. 15 is a perspective view of another electrical connector configured to attach at a rear surface of a mirror reflective element and have a wire or lead soldered thereto, in accordance with the present invention.
Figure 16:
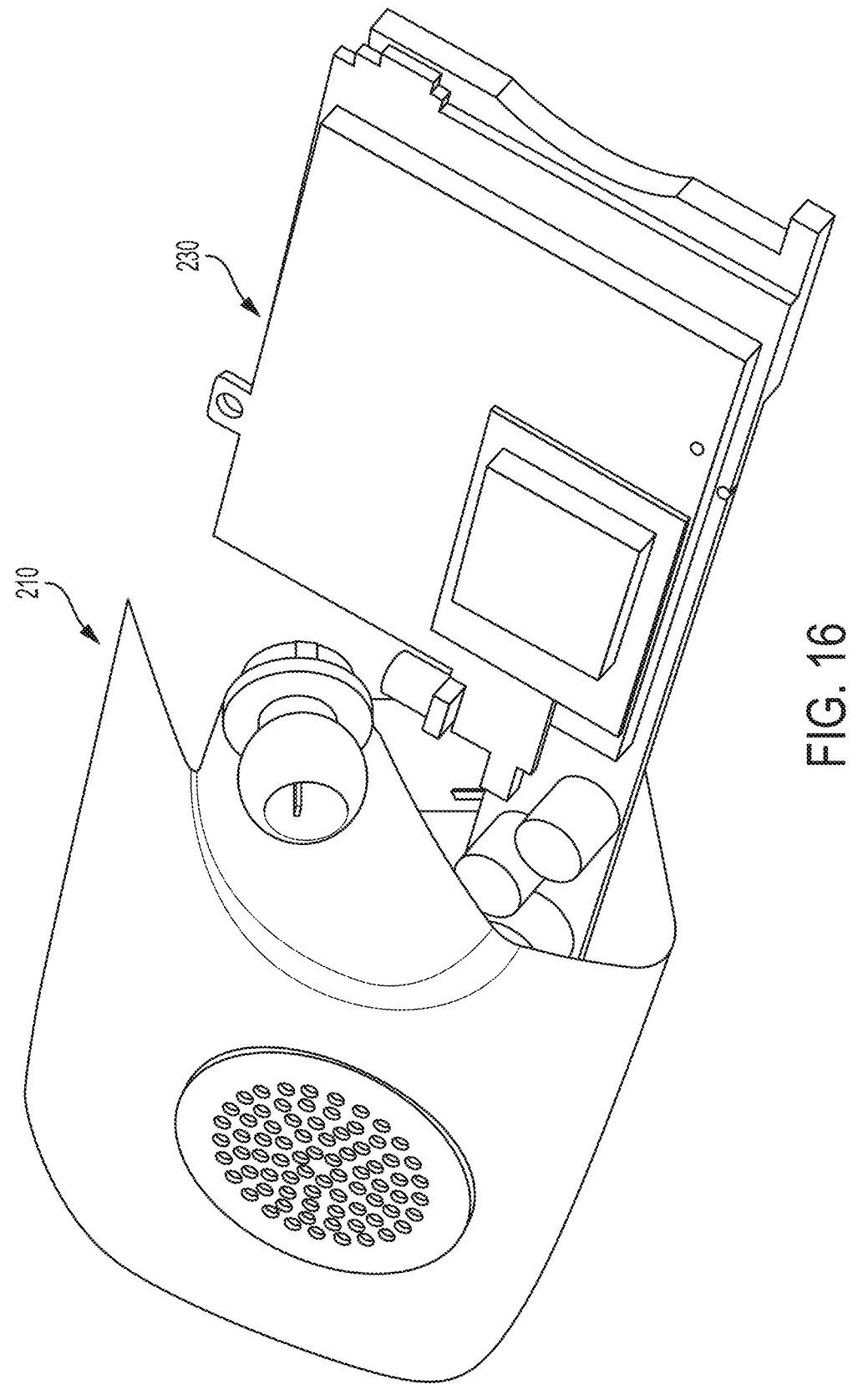
FIG. 16 is a perspective and partial cutaway view of an interior rearview mirror assembly of the present invention, with an angled circuit element disposed therein to provide a larger circuit element in a lower profile mirror head.

Optionally, and with reference to FIG. 15, a connector 130" may include a wire channel or recess 130e" formed at and across the attachment or soldering or welding pad or zone 130a" and spaced from the mirror reflective element when the attaching portion 130b" of the connector is attached or adhered or bonded at the rear surface of the rear substrate of the reflective element, with the tabs 130c" extending or wrapping over a portion of the perimeter edge of the rear substrate. The wire channel is configured to hold the wire in position during the soldering process that attaches or solders or welds the wire to the soldering pad. The wire channel may be sized with an appropriate width and depth to snugly or tightly receive the bare wire end therein (as shown in FIG. 15) to substantially hold the wire during the soldering process (or the channel may be sized larger than the wire gauge to generally or loosely hold the wire therein). The wire channel 130e" may be formed during the stamping or forming of the connector. The connector may comprise any suitable material, such as, for example, tin plated Beryllium Copper or the like. The connector 130" may otherwise be similar to connectors 130, 130', discussed above, such that a detailed discussion of the connectors need not be repeated herein.

Figures 17, 18, 19:
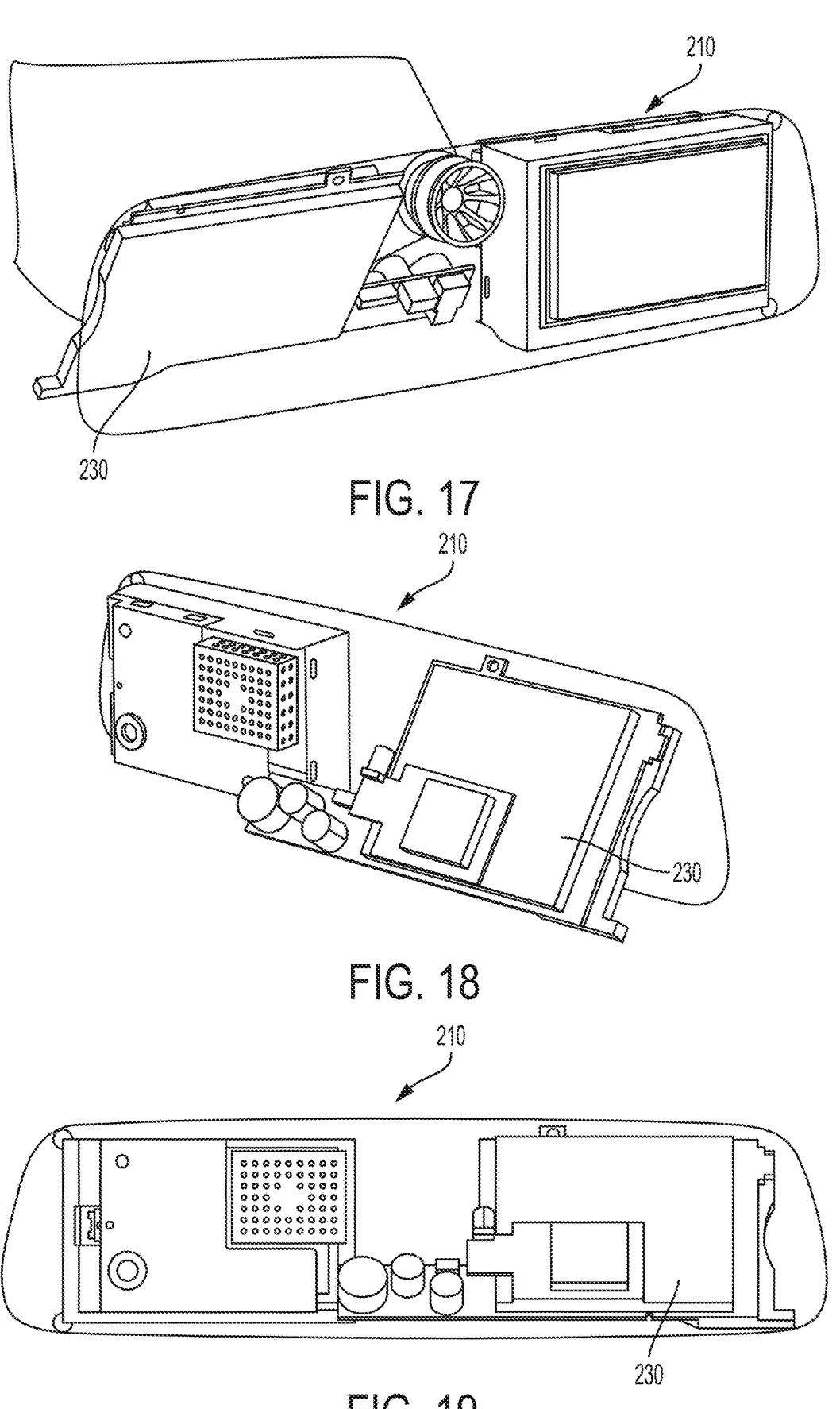
FIGS. 17-19 are other views of the mirror assembly of FIG. 16.

The mirror assembly may include one or more electrical accessories, such as a video display screen and/or the like, housed within the mirror casing. Optionally, and as shown in FIGS. 16-19, the mirror assembly 210 may include a circuit element 230, such as a printed circuit board or the like, disposed at an angle relative to the rear surface of the reflective element. In the illustrated embodiment, the circuit element comprises an electronic toll collection system (ETCS) that is operable to communicate with a transceiver at a toll booth or passway to effect payment of the appropriate toll to allow the equipped vehicle to pass or continue on the toll road or the like. The ETCS is sufficiently sized to allow for insertion of an identifier or identification card at the end of the mirror head. As can be seen in FIGS. 17 and 18, the angled configuration of the ETCS allows the ETCS to be large enough to receive the identification card therein, while allowing for a lower profile mirror reflective element and mirror head. The present invention thus allows for tilting of the ETCS mirror and offsetting the bracket to achieve a smaller or reduced profile or lower vertical height mirror head size. The mounting structure of the circuit element may utilize aspects of the mirror assemblies described in U.S. Pat. Nos. 7,370,983; 7,329,013 and/or 6,690,268, and/or U.S. Pat. Publication No. US-2006-0050018, which are hereby incorporated herein by reference in their entireties. Although shown and described as having an angled or canted or tilted ETCS circuit element, clearly other accessories may be established at a circuit element or board or structure and mounted within the mirror casing in the angled or canted or tilted manner as described above, while remaining within the spirit and scope of the present invention.

The reflective element and mirror casing of the mirror assembly of the present invention are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. Pat. Pub. No. US-2006-0061008, and/or PCT Application No. PCT/US2010/028130, filed Mar. 22, 2010 and published Sep. 30, 2010 as International Publication No. WO 2010/111173, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529, 108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633, 423; D633,019; D638,761 and/or D647,017, and/or International Publication Nos. WO 2010/124064; WO 2011/ 044312; WO 2012/051500; WO 2013/071070 and/or WO 2013/126719, which are hereby incorporated herein by reference in their entireties (and with electrochromic and prismatic mirrors of such construction are commercially available from the assignee of this application under the trade name INFINITY™ mirror).

Figure 20:
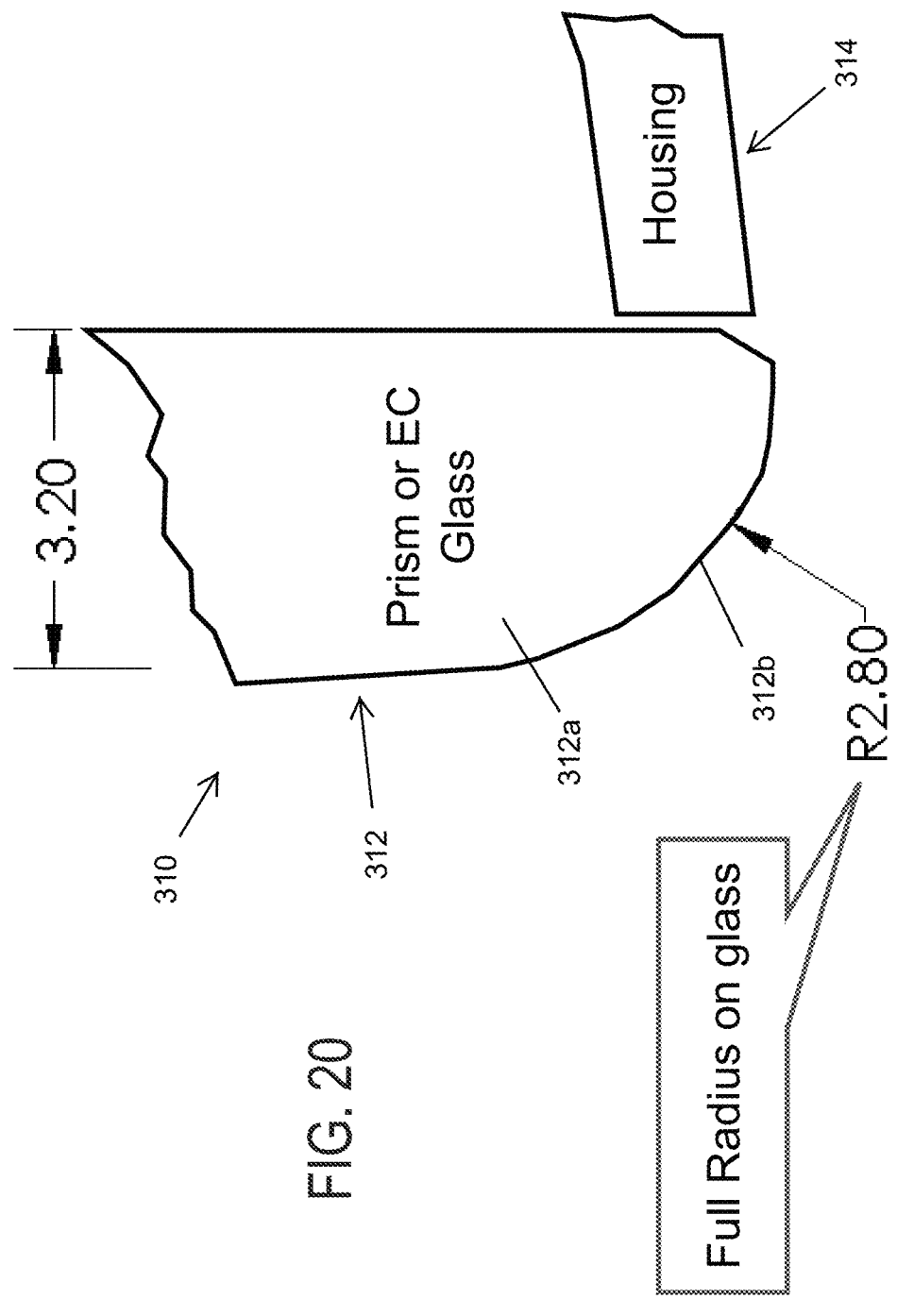
FIG. 20 is a sectional view of a frameless mirror assembly with a mirror reflective element having a glass substrate with a rounded perimeter edge.

For example, and with reference to FIG. 20, a mirror assembly 310 may have a mirror reflective element 312 that has a front glass substrate 312*a* that overlaps a portion of the mirror casing or housing 314, with the front glass substrate having a curved or rounded or radiused perimeter edge 312*b* (such as by utilizing aspects of the mirror assemblies described in International Publication Nos. WO 2010/ 124064; WO 2011/044312; WO 2012/051500; WO 2013/ 071070 and/or WO 2013/126719, which are hereby incorporated herein by reference in their entireties). In the illustrated embodiment, the glass substrate 312*a* has a thickness of about 3.2 mm and a radius of curvature of the perimeter edge 312*b* of about 2.8 mm or thereabouts, such that the full radius (the curved transition from the generally planar front substrate to the generally planar surface of the mirror casing) is on the glass perimeter edge. The outermost portion of the perimeter edge of the front glass substrate extends slightly outboard of the mirror casing such that the mirror casing is not exposed or viewable around the glass substrate by a person viewing the mirror assembly from in front of the glass substrate.

Figure 21:
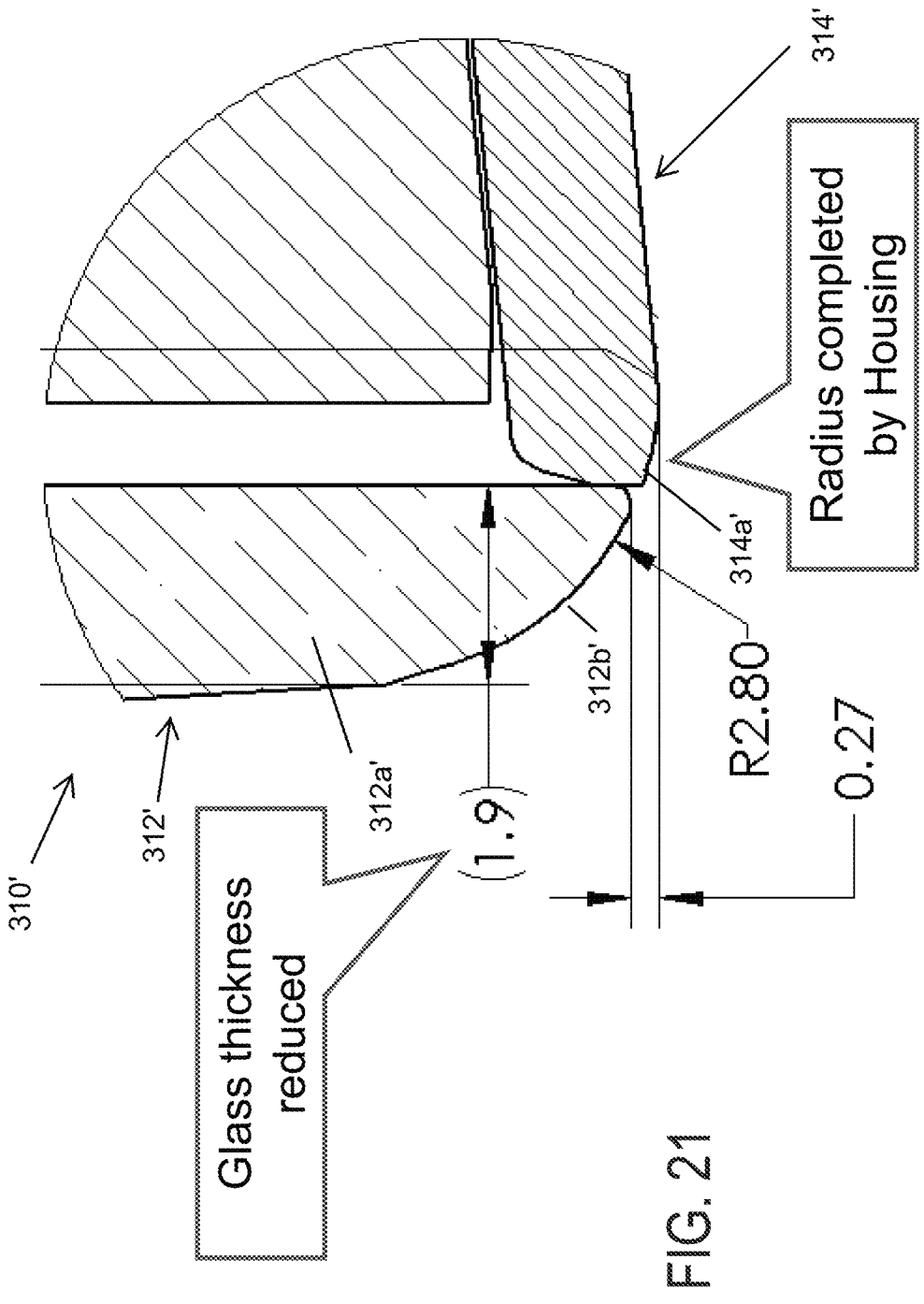
FIG. 21 is a sectional view of a frameless mirror assembly with a mirror reflective element having a reduced thickness glass substrate and partially rounded housing in accordance with the present invention.

The present invention, and such as shown in FIG. 21, provides a reduced weight frameless mirror assembly 310' (of similar construction as shown in FIG. 20) comprising a mirror reflective element 312' having a reduced thickness front glass substrate 312*a'* and a mirror casing or housing 314'. As shown in FIG. 21, the thickness of the glass may be less than the radius of curvature at the perimeter edge. In the illustrated embodiment, the glass substrate may have a thickness of about 1.9 mm, with the perimeter edge having a radius of curvature of about 2.8 mm or thereabouts. Thus, the radius of curvature is greater than the thickness of the glass substrate 312*a'*, such that a portion of the curved transition to the generally planar wall of the mirror casing 314' is provided by the outer end region 314*a'* of the casing itself. The curvature of the outer end region 314*a'* may at least substantially correspond to or match the curvature of the glass substrate to provide a generally continuous or uniform transition between the front surface of the glass substrate 312*a'* to the outer surface of the mirror casing 314'.

With the mirror assembly construction of FIG. 20, the thicker glass substrate is heavy and decreases vibration performance of the mirror assembly. The greater thickness dimension of the outer glass substrate is required because a full radius of about 2.8 mm, along with a small chamfer on the corner or back edge of the substrate was deemed necessary to provide the desired rounded appearance and function. The present invention, and as shown in FIG. 21, uses a thinner glass substrate by partially forming a 2.8 mm radius of curvature on the glass substrate and completing the curved transition with the mirror casing or housing or similar part. The reduced weight mirror assembly of the present invention may comprise a prismatic mirror reflective element (where the thinner or reduced thickness glass substrate comprises a prism-shaped glass substrate with a mirror reflector coating established thereon), or may comprise an electro-optic mirror reflective element, such as an electrochromic mirror reflective element (where the thinner or reduced thickness glass substrate comprises the first or front glass substrate of the reflective element, which includes a rear glass substrate and an electro-optic medium sandwiched between the front and rear glass substrates), while remaining within the spirit and scope of the present invention.

Because such a mirror construction uses a thinner glass substrate, which may result in a weaker reflective element, the mirror assembly may use a "reinforcement plate" or reinforcement within the attachment plate attached at the rear of the mirror reflective element. Optionally, the mirror assembly may use stronger material for the attachment plate, such as a stronger plastic or lightweight metal or the like. Optionally, the mirror assembly may use strengthened glass-such as GORILLA™ glass or Tempered glass or the like for the front glass substrate.

The mirror assembly of the present invention, with the reduced thickness front glass substrate, may provide the ability to use a small ball bracket system for all of the mount options for the mirror assembly. The mirror assembly of the present invention may also provide enhanced or very high vibration performance, particularly when used with larger ball diameter brackets. The mirror assembly of the present invention may also provide enhanced vibration performance with plastic stays. The mirror assembly of the present invention may also provide an overall mirror weight reduction.

Figure 22:
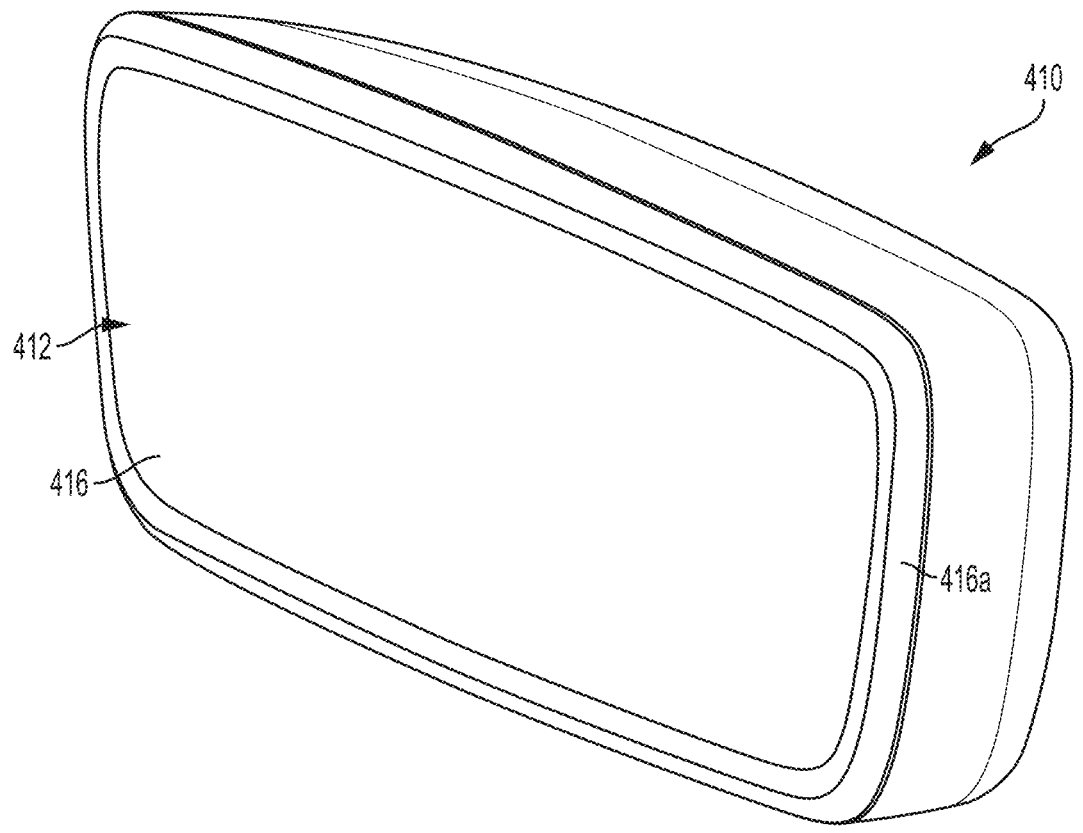
FIG. 22 is a perspective view of another frameless mirror assembly of the present invention.
Figures 23A, 23B:
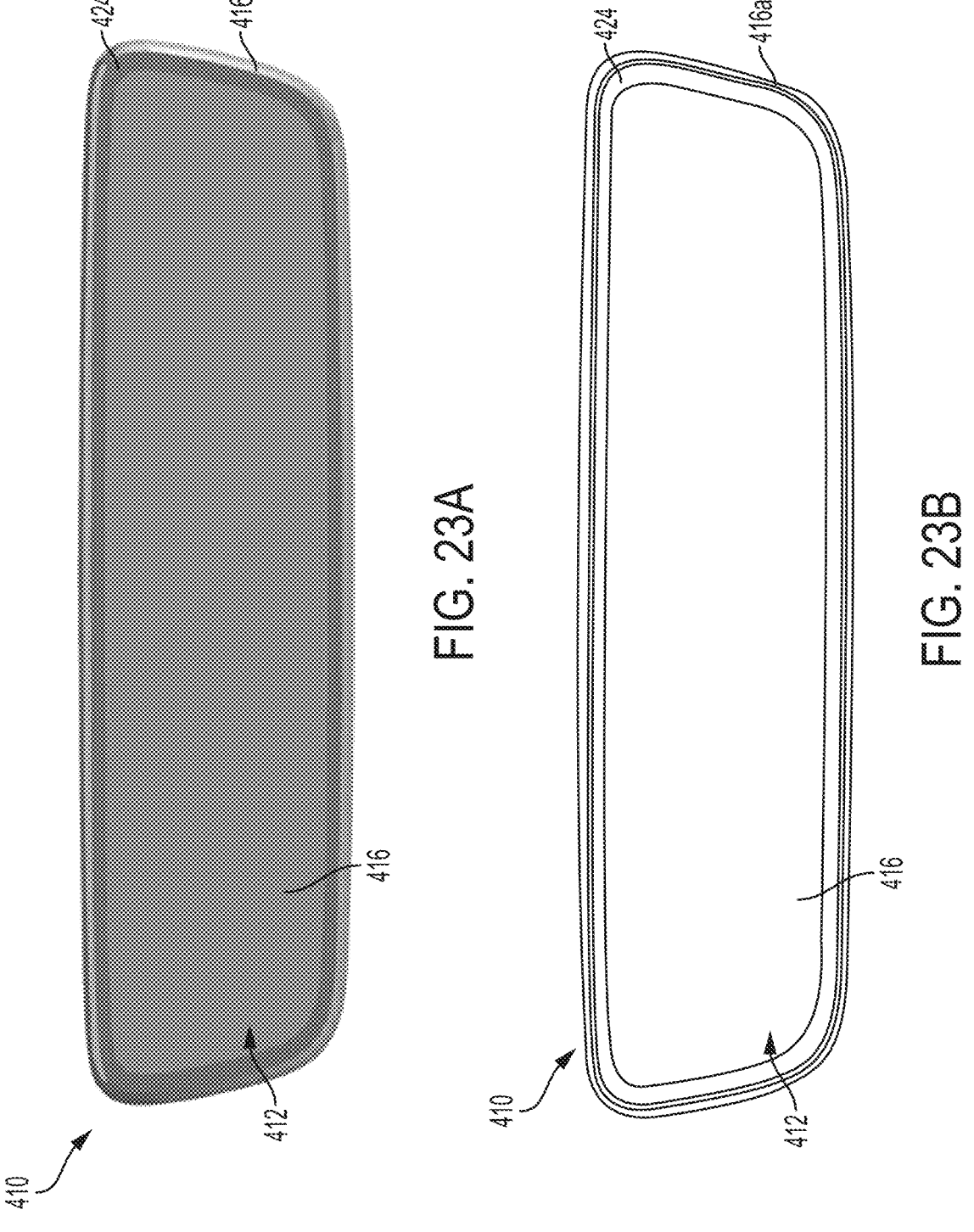
FIGS. 23A and 23B are plan views of the frameless mirror assembly of FIG. 22.
Figure 24:
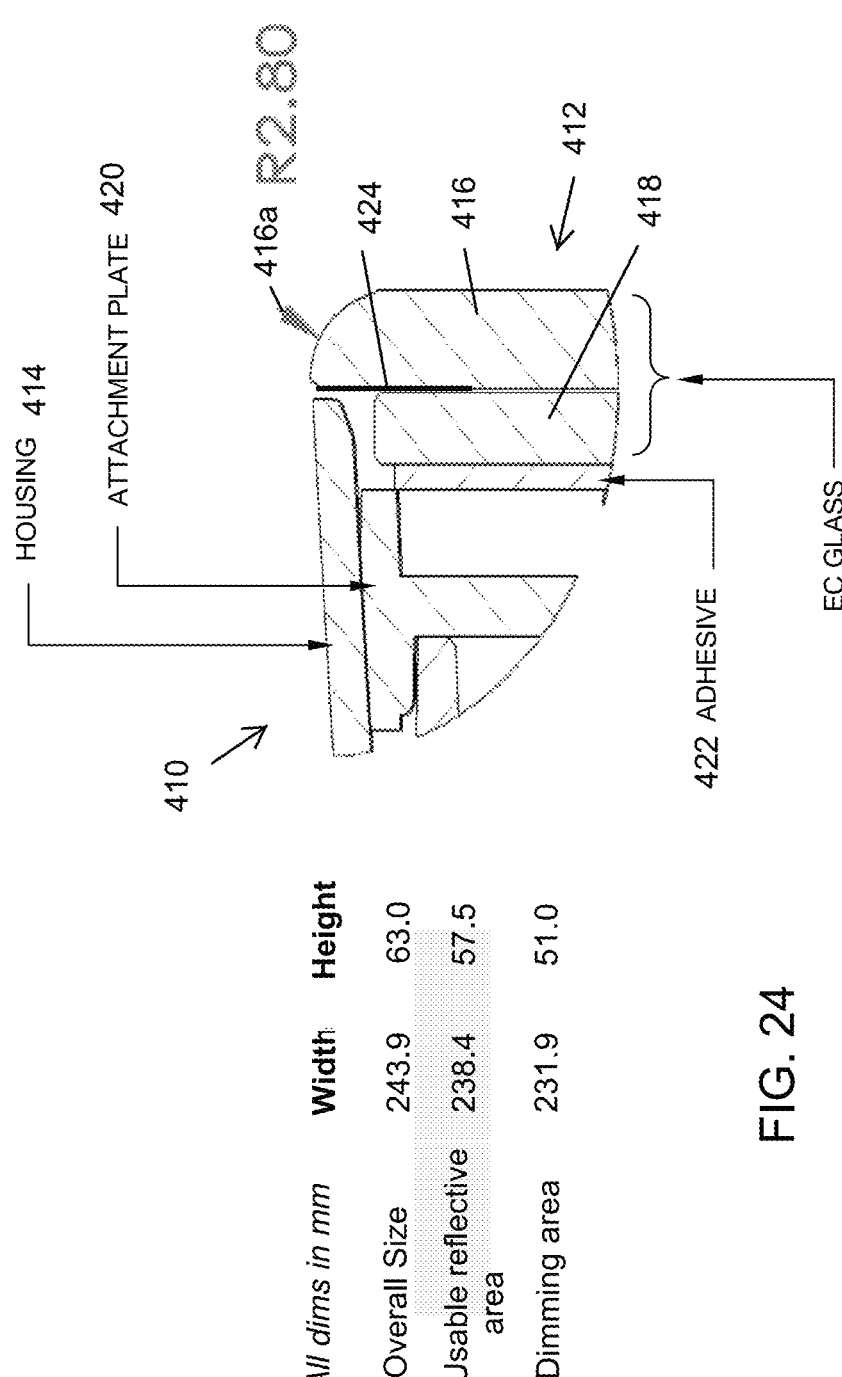
FIG. 24 is a sectional view of a portion of the frameless mirror assembly of FIGS. 22 and 23.

Optionally, and with reference to FIGS. 22-24, an electro-optic frameless mirror reflective element 412 may have a radiused or rounded perimeter edge 416a around its front substrate 416 so that the perimeter edge of the front substrate is exposed to and viewable by the driver of the vehicle (when the mirror assembly is normally mounted in the vehicle and the driver is normally operating or driving the vehicle). As shown in FIG. 24, the housing 414 of the mirror assembly 410 may overlap or encompass the perimeter edge region of the rear substrate 418 of the reflective element, which is attached at an attachment plate 420 via a layer of adhesive or tape 422 or the like. The reflective element may include a perimeter band (such as a reflective perimeter band) 424 that is disposed about the periphery of the rear surface of the front substrate to hide the perimeter seal of the reflective element from view by a person viewing the mirror.

Figure 25:
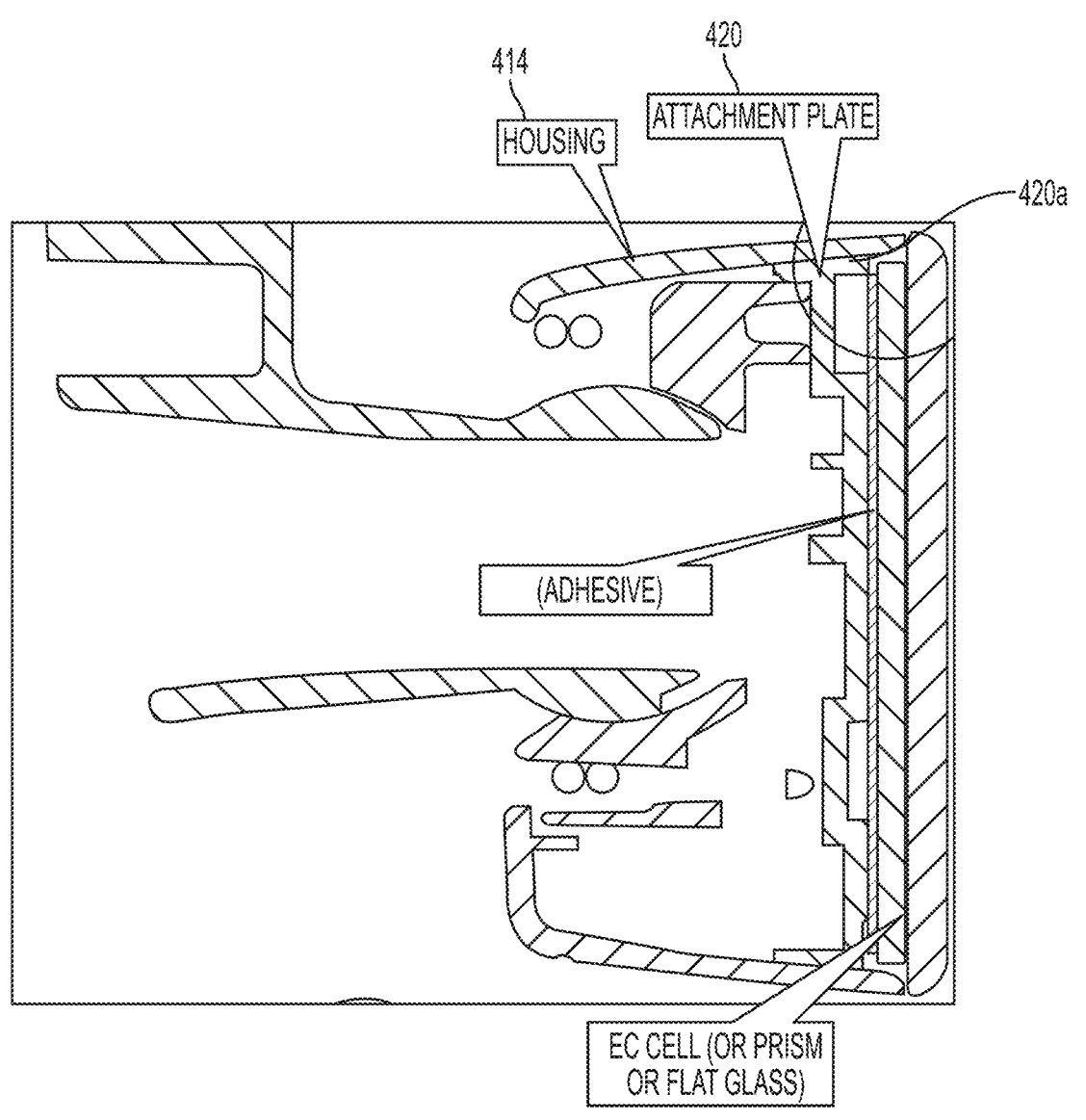
FIG. 25 is a sectional view of a portion of another frameless mirror assembly of the present invention, showing another attachment plate of the present invention.
Figure 26:
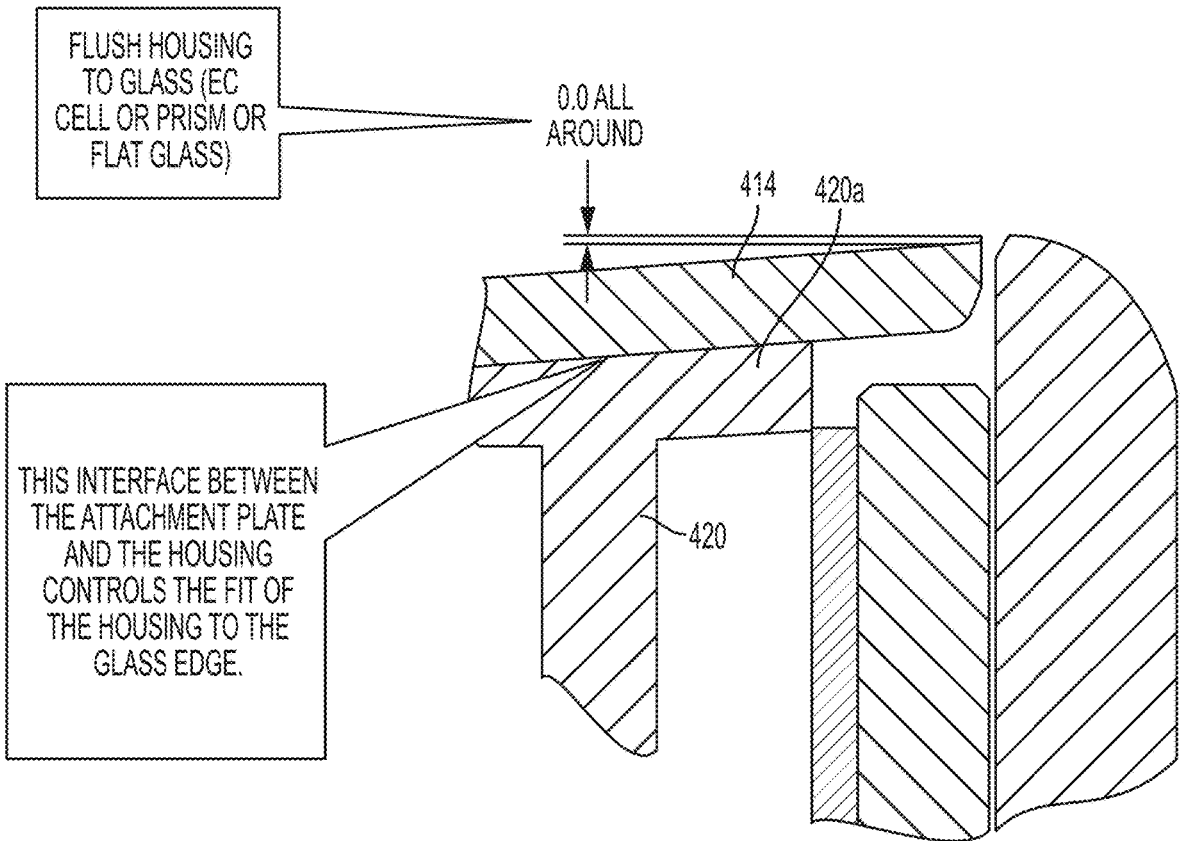
FIG. 26 is an enlarged sectional view of a portion of FIG. 25.

Optionally, and with reference to FIGS. 25-28, the attachment plate may be used to control the mirror casing or housing to achieve a flush fit to an EC Cell or Prism. The attachment plate 420 functions as a fixture that the mirror casing or housing 414 conforms to when the attachment plate is received in or pressed into the mirror housing. The mirror housing is designed with slight interference fit or tolerance to make sure that the attachment plate defines the shape or profile or contour of the mirror housing. Plastic mirror housings tend to warp inward at the top and bottom regions. However, the attachment plate configuration and interface of the present invention functions to urge against and spread the walls of the mirror housing reliably regardless of any warping of the housing that may occur during or after molding of the mirror housing or casing. As shown in FIGS. 24-26, the attachment plate 420 includes a peripheral flange 420a that provides a substantially uniform surface that is pressed or urged against the inner surface of the mirror casing or housing when the attachment plate is disposed in or pressed into the mirror casing or housing.

Figures 27, 28:
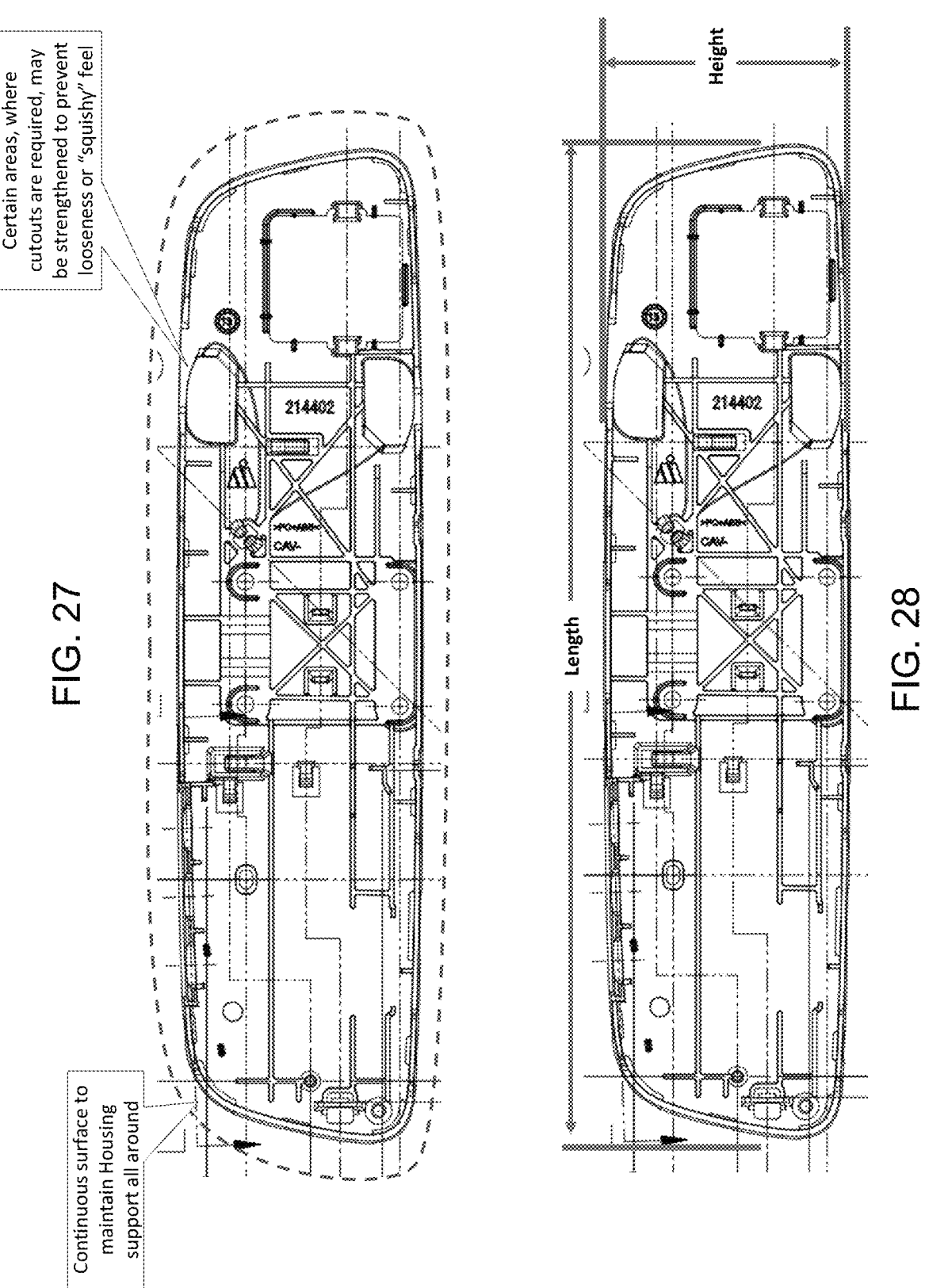
FIGS. 27 and 28 are plan views of the mirror attachment plate of the present invention.

Thus, the attachment plate and peripheral flange thereof provides a substantially uniform surface around the perimeter of the attachment plate, and that substantially uniform surface engages and is urged against the inner surface of the mirror casing or housing to achieve a tight housing fit, with no looseness or gaps between the periphery of the attachment plate or flange and the walls of the mirror housing. The flushness of the housing may be tuned by adjusting the process of forming and attaching the attachment plate to achieve a different size. The length and height of the mirror head thus can be tuned together (not independently) to achieve the desired fit. As shown in FIG. 27, certain areas of the attachment plate, such as where cutouts may be desired or required, may be strengthened to enhance the strength and rigidity of the attachment plate to limit or substantially preclude looseness.

Figure 29:
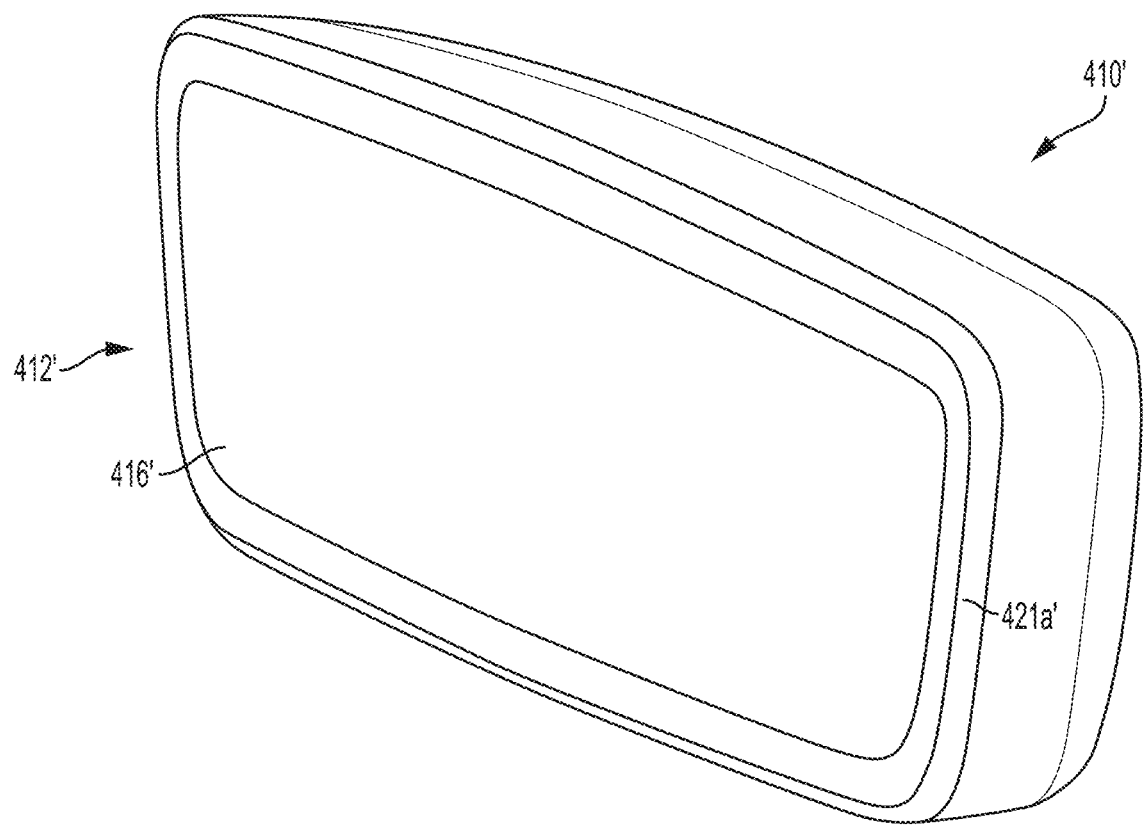
FIG. 29 is a perspective view of another mirror assembly of the present invention.
Figures 30A, 30B:
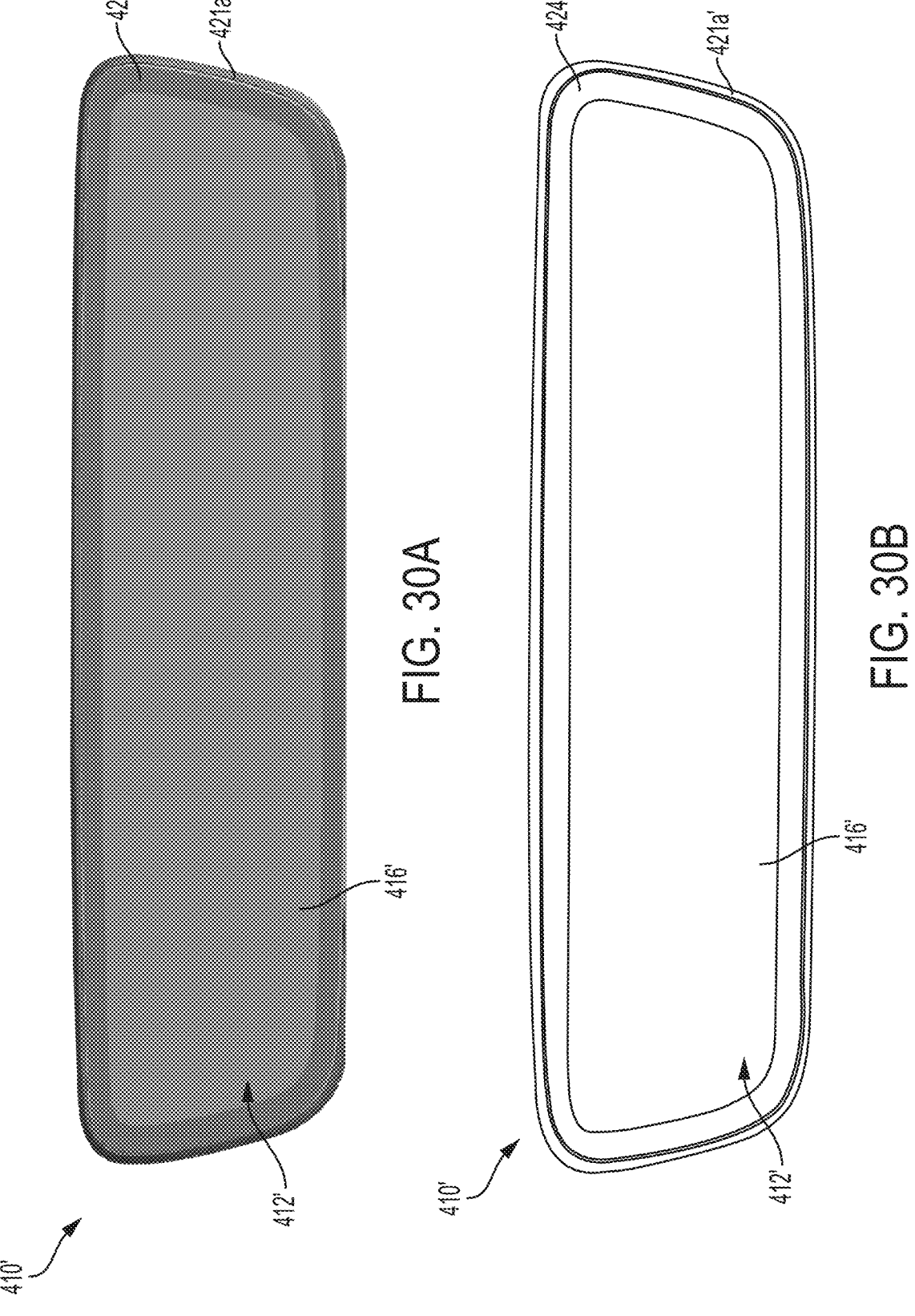
FIGS. 30A and 30B are plan views of the mirror assembly of FIG. 29.
Figure 31:
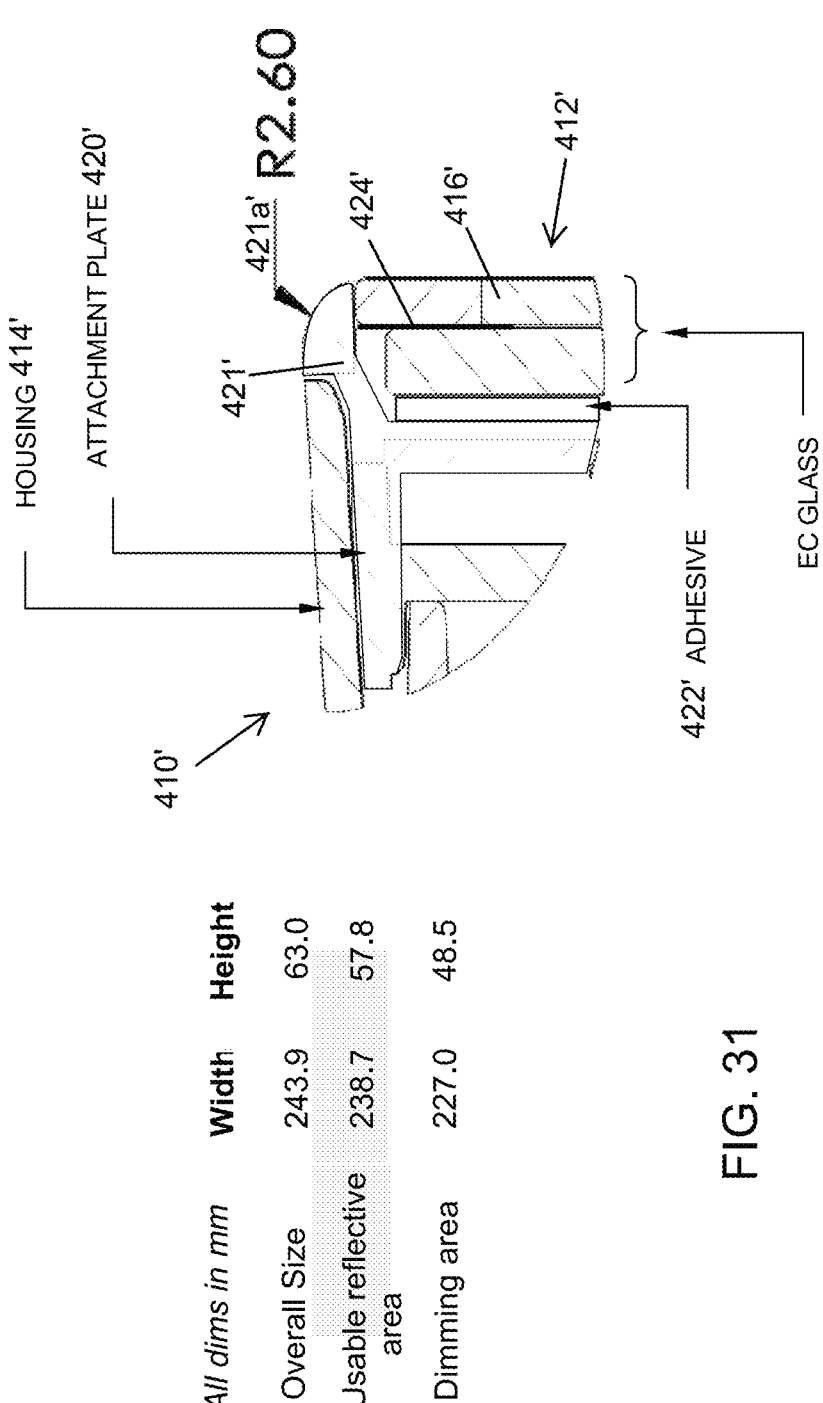
FIG. 31 is a sectional view of a portion of the mirror assembly of FIGS. 29, 30A and 30B.

Optionally, and with reference to FIGS. 29-31, an electro-optic frameless mirror reflective element 412' may have an attachment plate or backplate 420' that has a perimeter portion 421' that protrudes between the periphery of the mirror reflective element and the mirror casing or housing 414' and that has a radiused or rounded perimeter edge 421a' so that the perimeter edge of the attachment plate protrusion is exposed to and viewable by the driver of the vehicle (when the mirror assembly is normally mounted in the vehicle and the driver is normally operating or driving the vehicle). As shown in FIG. 31, the attachment plate protrusion 421a' is formed to overlap or encompass the perimeter edge region of the reflective element, which is attached at the attachment plate 420' via a layer of adhesive or tape 422' or the like. The reflective element may include a perimeter band 424' that is disposed about the periphery of the rear surface of the front substrate to hide the perimeter seal of the reflective element from view by a person viewing the mirror. In the illustrated embodiment, the radiused outer surface or portion 421a' of the attachment plate protrusion 421' provides a radius of curvature of about 2.6 mm or thereabouts, and may provide a generally smooth or continuous transition between the front surface of the reflective element and the outer surface of the mirror housing or casing at the rear portion of the attachment plate protrusion. Thus, the attachment plate creates a 2.6 mm radius of curvature surface or bezel portion around the edge of the glass substrate of the mirror reflective element.

The attachment plate and mirror construction of the present invention thus provides a rounded or curved or radiused outer perimeter region of the mirror assembly, while providing a greater usable reflective area. For example, for a mirror reflective element having a width of about 243.9 mm and a height of about 63 mm, the usable reflective area (the area of the front surface of the glass substrate that is flat or not beveled or radiused) may have a width of about 238.7 mm and a height of about 57.8 mm, and the dimming area (the area inside the reflective perimeter band) may have a width of about 227 mm and a height of about 48.5 mm. In comparison, the reflective element of the mirror assembly of FIGS. 22-24 may have the same overall size but may have a usable reflective area of only about 238.4 mm wide and about 57.5 mm high (due to the radiused perimeter edge region of the front substrate).

Figure 32:
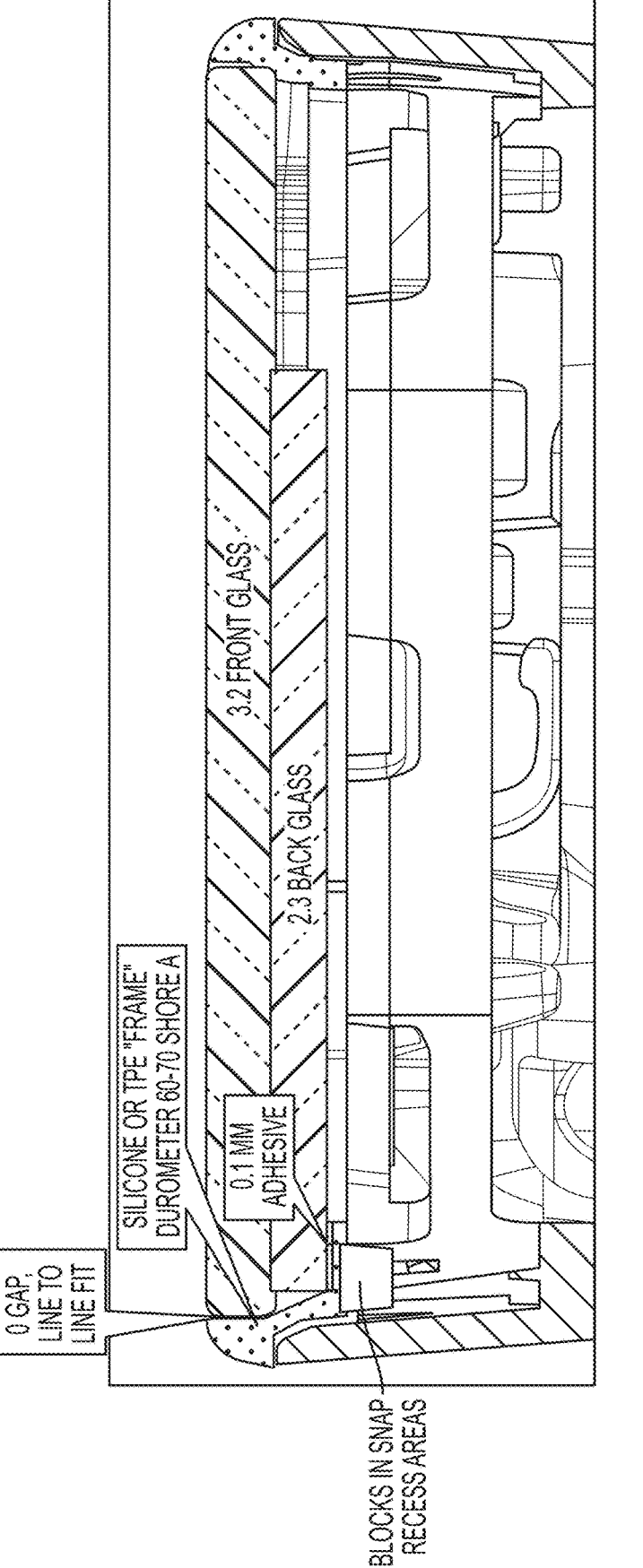
FIG. 32 is a sectional view of a portion of another mirror assembly of the present invention.

Optionally, and as shown in FIG. 32, the protrusion may comprise a separate frame portion or part (separate from the attachment plate) that circumscribes the reflective element and provides a zero gap, line to line fit around the reflective element, and that blocks in the snap recess areas. The frame protrusion (at a peripheral portion of the attachment plate) may be adhered to the rear surface of the rear substrate, such as via an adhesive layer having a thickness or bondline thickness of about 0.1 mm or thereabouts. The frame protrusion may comprise a silicone or TPE frame element around the reflective element (and around the attachment plate). The frame protrusion or element may have a material hardness of a durometer 60-70 Shore A or thereabouts.

Optionally, and such as discussed above with respect to FIGS. 20-25, the reflective element may have the outer perimeter edge region of its glass substrate (such as the front substrate of an electro-optic reflective element or the glass substrate of a prismatic reflective element or non-electro-optic reflective element) rounded or curved or radiused so that the radiused glass is exposed to and viewable by the driver of the vehicle. Optionally, the radiused glass perimeter edge region may be polished to provide a smooth water-clear surface at the perimeter edge of the glass substrate, with the perimeter band disposed behind the radiused portion to hide the perimeter seal and provide a reflective area at the perimeter seal and outboard thereof. In such a configuration, when the electro-optic reflective element is dimmed (such as in response to a glare sensor or the like), the region at the perimeter band and radiused perimeter is not dimmed, and there may be some glare at the outer perimeter regions of the reflective element.

Optionally, the radiused glass perimeter edge region may be frosted or non-water-clear to provide a frosted or non-smooth appearance around the periphery of the mirror reflective element. When the electro-optic reflective element is dimmed, the frosted or non-polished radiused perimeter edge region limits glare at the surface of the mirror reflective element, thereby providing enhanced appearance of the mirror reflective element when the element is dimmed.

With a smooth, polished radiused perimeter edge region, any contaminants that may be disposed at the radiused edge may usually be readily wiped clean from the polished surface, such as in a similar manner as they would be from the planar polished front surface of the glass substrate. However, a frosted or non-polished perimeter surface may be more prone to collecting contaminants and may resist easy cleanup of such contaminants. Thus, the present invention provides for such frosting or non-polishing to a degree that provides the desired reduction in glare while limiting resistance to clean up of contaminants therefrom.

Figure 34:
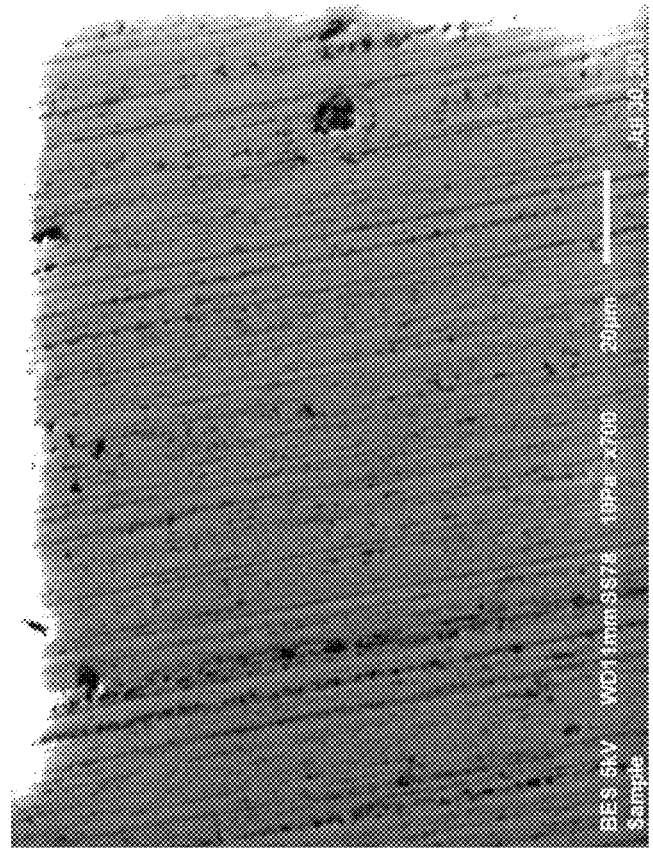
FIG. 34 is an electron microscope image of a polished edge of a glass substrate.
Figure 33:
FIG. 33 is an electron microscope image of a frosted edge of a glass substrate.

The frosting finish may be achieved on the rough ground edge via any suitable means, such as via chemical etching, finer grinding or polishing or the like. Optionally, and desirably, the radiused edge and desired finish is achieved via a rough grind, followed by a fine grind and then a seaming process, using selected grit sizes for each process, in order to provide desired frosting, but not so much that fingerprints are problematic. For example, a rough grind may first be done with a grinding wheel comprising about a 225/270 mesh (which means that the wheel has a range of 225-270 mesh diamonds bonded to it, with the lower the mesh size the rougher the wheel), followed by a fine grind with a grinding wheel about a 500/600 mesh and a seaming process with a wheel having about a 325/400 mesh (while a smooth water-clear surface may be achieved by similar wheels and grinding processes, but with an additional clay polishing wheel to finish or polish the surface). Thus, and as can be seen with reference to FIGS. 33 and 34, the frosted edge surface (FIG. 33) is rougher than the polished edge surface (FIG. 34), thus reducing or limiting glare off of the frosted surface.

Figure 35:
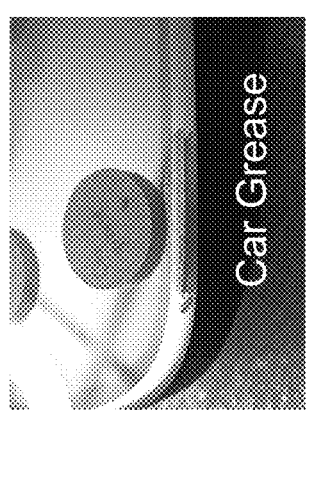
FIGS. 35-37 are views of portions of a frameless mirror assembly with contaminants on a portion of the frosted rounded perimeter edge region, showing different degrees of cleaning of the mirror reflective element.
Figure 35:
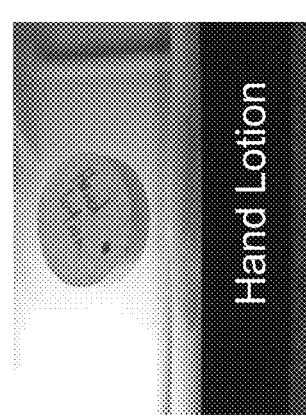
Figure 35:
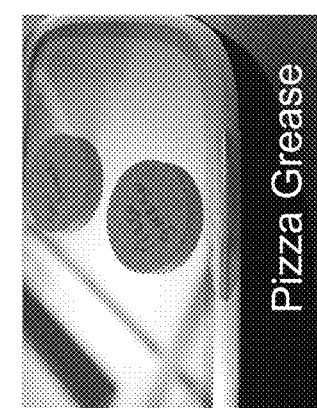
Figure 35:
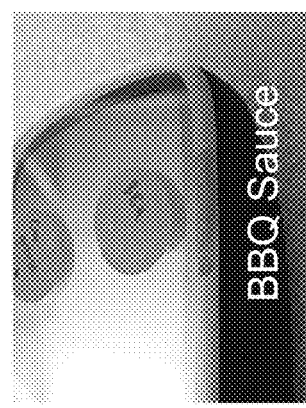
Figure 35:
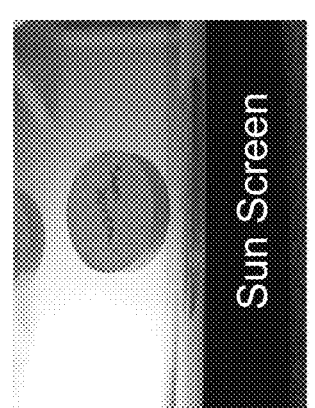
Figure 35:
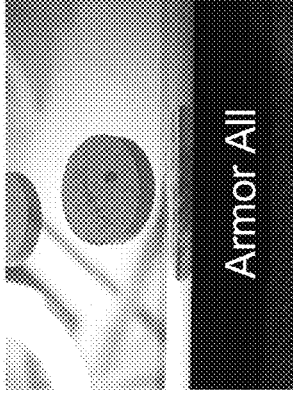
Figure 35:
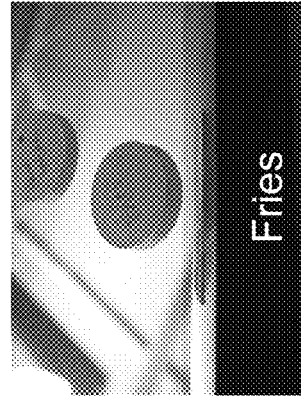
Figure 35:
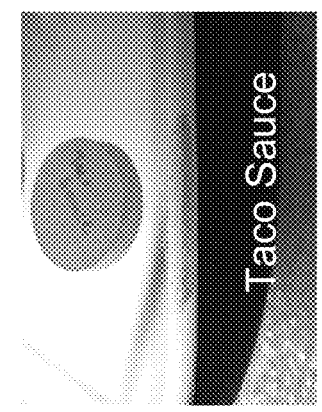
Figure 36:
Figure 36:
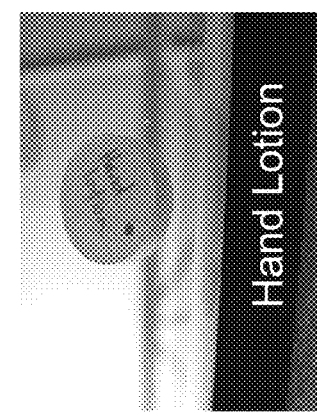
Figure 36:
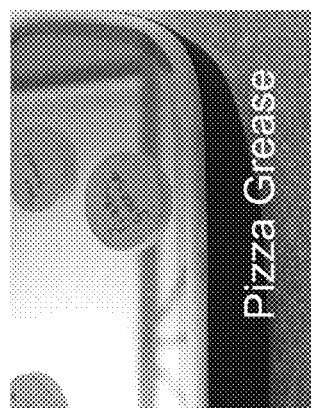
Figure 36:
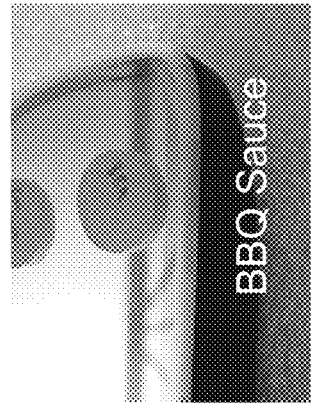
Figure 36:
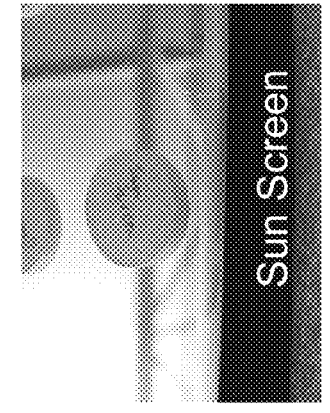
Figure 36:
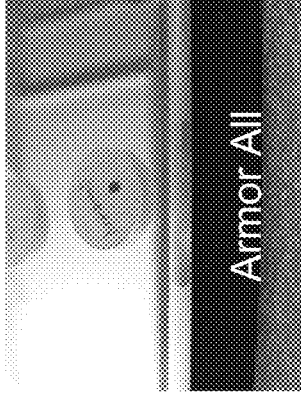
Figure 36:
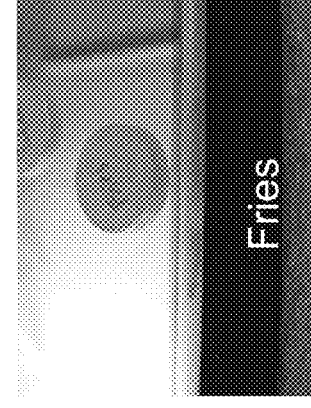
Figure 36:
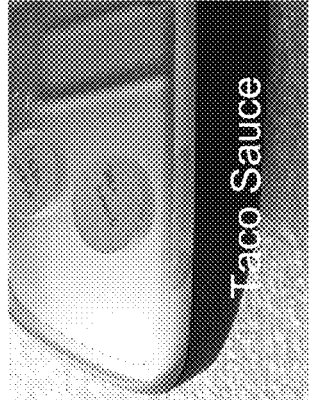
Figure 37:
Figure 37:
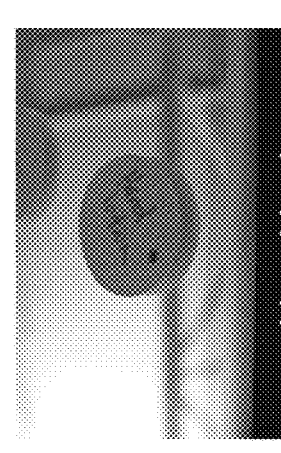
Figure 37:
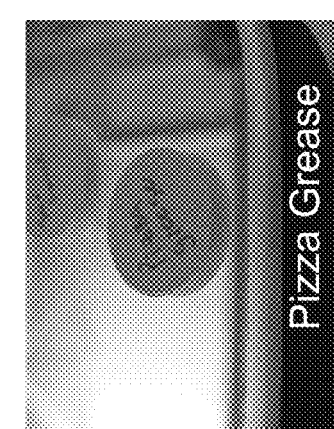
Figure 37:
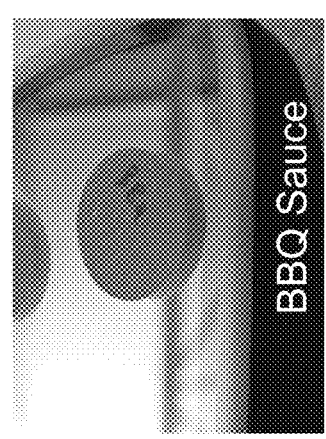
Figure 37:
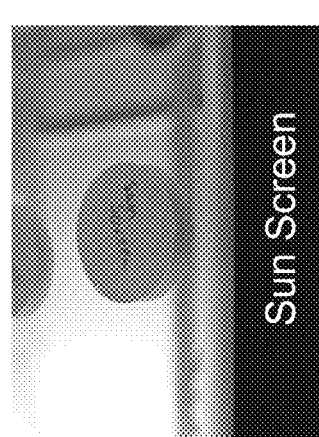
Figure 37:
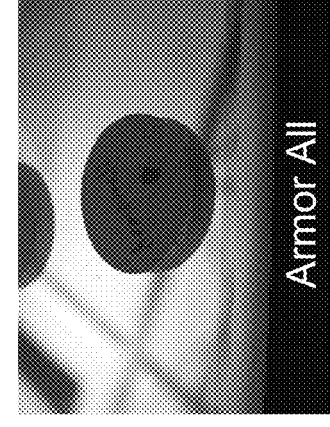
Figure 37:
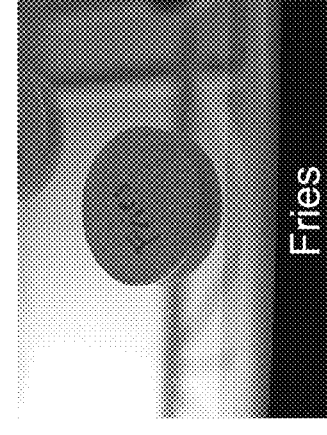
Figure 37:
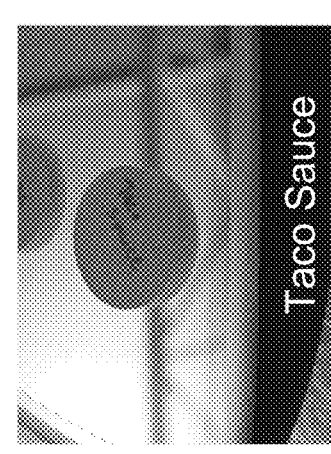

When using the preferred grinding process, the frosted perimeter edge has the desired degree of frosting or roughness, while providing the desired ease of cleanup of the frosted edge. For example, and with reference to FIG. 35, the frosted perimeter edge was contaminated with various materials, including, for example, ARMOR ALL®, car grease, oil or grease from french fries, barbeque sauce, taco sauce, pizza grease, hand lotion and sun screen. After just a dry wipe with a cloth (FIG. 36), the visibility of the contaminants was reduced, and after a wipe with water and cloth (FIG. 37), more of the contaminants were removed. More particularly, testing resulted in the sun screen, hand lotion, barbeque sauce and taco sauce were wiped completely off with the water and cloth wipe, but there was still some residue of the pizza grease, car grease, ARMOR ALL® and fries. A glass cleaner wipe was then performed and there was still some residue but less than after the water and cloth wipe (the amount of residue was not readily noticeable or discernible unless looking for it and only at certain angles). The remaining residue was then wiped with isopropyl alcohol, which resulted in the frosted radiused edge being returned to its original clean finish, with no residue remaining thereon.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274, 501; 7,255,451; 7,195,381; 7,184,190; 6,690,268; 5,140, 455; 5,151,816; 6,178,034; 6,154,306; 6,002,544; 5,567, 360; 5,525,264; 5,610,756; 5,406,414; 5,253,109; 5,076, 673; 5,073,012; 5,117,346; 5,724,187; 5,668,663; 5,910, 854; 5,142,407 and/or 4,712,879, and/or PCT Application No. PCT/US2010/029173, filed Mar. 30, 2010 and published Oct. 7, 2010 as International Publication No. WO 2010/114825, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties, and/or as described in U.S. Pat. No. 7,195,381, which is hereby incorporated herein by reference in its entirety.

Although shown as an electrochromic mirror application, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, published Apr. 8, 2010, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327, 288; 4,948,242; 4,826,289; 4,436,371 and 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274, 501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (which are hereby incorporated herein by reference in their entireties), that can benefit from the present invention.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, published Apr. 8, 2010, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and 6,369,804, which are hereby incorporated herein by reference in their entireties, and/or the like, while remaining within the spirit and scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; 6,420,975; 6,477,464; 6,946,978; 7,308, 341; 7,167,796; 7,004,593; 7,657,052 and/or 6,678,614, and/or U.S. Pat. Pub. No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 7,855;755; 7,338,177; 7,274,501; 7,255,451; 7,195,381; 7,184,190; 7,046,448; 5,668,663; 5,724, 187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent applications, Ser. No. 13/023,750, filed Feb. 9, 2011, now U.S. Pat. No. 8,890,955, and/or Ser. No. 09/585,379, filed Jun. 1, 2000, now abandoned, and/or U.S. Pat. Pub. Nos. US-2003-0007261; US-2006-0061008; US-2006-0050018; US-2009-0015736; US-2009-0015736 and/or US-2010-0097469, and/or PCT Application No. PCT/US2010/047256, filed Aug. 31, 2010 and published Mar. 10, 2011 as International Publication No. WO 2011/028686, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201, 642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EYEQ™ image processing chip available from Mobileye Vision Technologies Ltd. of Jerusalem, Israel, and such as an image processor of the types described in International Pub. No. WO 2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796, 176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249, 860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720, 580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760, 962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6, 124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and publications being commonly assigned and being hereby incorporated herein by reference in their entireties).

Optionally, the mirror assembly may include other electrically operated or powered accessories, such as a compass sensor and compass display. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370, 983; 7,329,013; 7,289,037; 7,249,860; 7,004,593; 6,928, 366; 6,642,851; 6,140,933; 4,546,551; 4,862,594; 4,937, 945; 5,699,044; 4,953,305; 5,131,154; 5,255,442; 5,576, 687; 5,632,092; 5,677,851; 5,708,410; 5,737,226; 5,802, 727; 5,878,370; 5,924,212; 6,087,953; 6,173,508; 6,222,460 and/or 6,513,252, and/or European patent application, published Oct. 11, 2000 under Publication No. EP 0 1043566, and/or U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. Pat. Pub. No. US-2006-0061008, which are hereby incorporated herein by reference in their entireties, and/or such as by utilizing aspects of an EC driver-on-a-chip such as described in U.S. Pat. No. 7,480, 149, which is hereby incorporated herein by reference in its entirety.

The mirror assembly may comprise or utilize aspects of other types of casings or the like, such as described in U.S.

Pat. Nos. 7,338,177; 7,289,037; 7,249,860; 6,439,755; 4,826,289 and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184, 190, and/or in U.S. Pat. Pub. Nos. US-2006-0061008 and/or US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. Pat. Pub. Nos. US-2006-0050018 and/or US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Pat. Pub. No. US-2006-0050018, which are hereby incorporated herein by reference in their entireties.

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281 which are hereby incorporated herein by reference in their entireties.

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:

a mirror head comprising a mirror casing and a mirror reflective element;

a mounting assembly configured to mount at the vehicular interior rearview mirror assembly at an interior portion of a vehicle, wherein the mirror head is adjustable relative to the mounting assembly via a pivot joint;

wherein the mirror casing comprises a sidewall having a wall thickness spanning between an inner surface of the sidewall and an outer surface of the sidewall;

wherein the sidewall comprises an outer end region that circumscribes an open portion of the mirror casing;

wherein the mirror reflective element is disposed at the outer end region of the sidewall at the open portion of the mirror casing;

wherein the mirror reflective element comprises at least a first glass substrate, and wherein the first glass substrate has a front surface and a rear surface and a substrate thickness spanning between the front surface of the first glass substrate and the rear surface of the first glass substrate;

wherein, with the vehicular interior rearview mirror assembly mounted at the interior portion of the vehicle, the front surface of the first glass substrate is closer than the rear surface of the first glass substrate to a driver of the vehicle who is operating the vehicle; and wherein a circuit element is attached within the mirror head, and wherein the circuit element comprises a planar substrate having circuitry thereat, and wherein, with the vehicular interior rearview mirror assembly mounted at the interior portion of the vehicle, a plane of the planar substrate of the circuit element that intersects a lower portion of the mirror head and an upper portion of the mirror head is non-parallel to a plane of the rear surface of the first glass substrate.

2. The vehicular interior rearview mirror assembly of claim 1, wherein the circuit element comprises an electronic toll collection system that is operable to communicate with a transceiver of a toll road to effect payment of a toll to allow the vehicle to continue on the toll road.

3. The vehicular interior rearview mirror assembly of claim 1, wherein a video display screen is disposed within the mirror head behind the mirror reflective element and is operable to display video images, and wherein the displayed video images are viewable through the mirror reflective element.

4. The vehicular interior rearview mirror assembly of claim 1, wherein the rear surface of the first glass substrate abuts at least a portion of the open portion of the mirror casing.

5. The vehicular interior rearview mirror assembly of claim 1, wherein the mounting assembly comprises a single pivot joint mounting assembly.

6. The vehicular interior rearview mirror assembly of claim 5, wherein, with the vehicular interior rearview mirror assembly mounted at the interior portion of the vehicle, a wire harness is routed through the pivot joint to electrically connect circuitry within the mirror head to a power source of the vehicle.

7. The vehicular interior rearview mirror assembly of claim 1, wherein the mirror reflective element comprises an electro-optic mirror reflective element comprising the first glass substrate and a second glass substrate, and wherein the rear surface of the first glass substrate has a transparent conductive coating established thereat, and wherein a front surface of the second glass substrate has a mirror reflector established thereat, and wherein an electro-optic medium is sandwiched between and contacts the transparent conductive coating of the first glass substrate and the mirror reflector of the second glass substrate, and wherein the electro-optic medium is bounded by a perimeter seal.

8. The vehicular interior rearview mirror assembly of claim 7, wherein a first electrical connector is in electrically conductive continuity with the transparent conductive coating at the rear surface of the first glass substrate, and wherein a second electrical connector is in electrically conductive continuity with the mirror reflector at the second glass substrate, and wherein the first electrical connector comprises (i) a connector attaching portion for attaching the first electrical connector at the electro-optic mirror reflective element and (ii) a conductor attaching portion for soldering or welding an electrical conductor to the first electrical connector, and wherein the conductor attaching portion is spaced from a plane of the connector attaching portion, and wherein an electrical conductor is electrically connected between the first electrical connector and reflectance control circuitry that is operable to vary reflectance of the electro-optic mirror reflective element.

9. The vehicular interior rearview mirror assembly of claim 7, wherein the electro-optic mirror reflective element comprises an electrochromic mirror reflective element.

10. The vehicular interior rearview mirror assembly of claim 1, wherein the interior portion of the vehicle comprises a region of a windshield of the vehicle.

11. The vehicular interior rearview mirror assembly of claim 1, wherein the mirror reflective element comprises a prismatic mirror reflective element.

12. The vehicular interior rearview mirror assembly of claim 1, wherein the first glass substrate comprises a flat region at the front surface and a rounded perimeter edge circumscribing the flat region and extending at least partially between the flat region and the rear surface.

13. The vehicular interior rearview mirror assembly of claim 12, wherein, with the vehicular interior rearview mirror assembly mounted at the interior portion of the vehicle, the rounded perimeter edge of the first glass substrate is contactable by and is viewable by the driver of the vehicle.

14. The vehicular interior rearview mirror assembly of claim 13, wherein the rounded perimeter edge of the first glass substrate has a radius of curvature of at least 2.5 mm.

15. The vehicular interior rearview mirror assembly of claim 14, wherein the substrate thickness of the first glass substrate is less than 2 mm.

16. The vehicular interior rearview mirror assembly of claim 13, wherein no portion of the mirror casing encroaches onto the rounded perimeter edge of the first glass substrate.

17. The vehicular interior rearview mirror assembly of claim 13, wherein the outer end region of the sidewall of the mirror casing comprises a rounded outer surface curving between the open portion of the mirror casing and a less-curved outer surface of the sidewall of the mirror casing.

18. The vehicular interior rearview mirror assembly of claim 17, wherein the rounded perimeter edge of the first glass substrate has a first radius of curvature, and wherein the rounded outer surface of the outer end region of the mirror casing has a second radius of curvature, and wherein the second radius of curvature matches the first radius of curvature.

19. The vehicular interior rearview mirror assembly of claim 18, wherein curvature of the rounded outer surface of the outer end region of the sidewall of the mirror casing matches curvature of the rounded perimeter edge of the first glass substrate.

20. The vehicular interior rearview mirror assembly of claim 18, wherein the rounded outer surface of the outer end region of the sidewall of the mirror casing and the rounded perimeter edge of the first glass substrate combine to provide a curved transition between the flat region at the front surface of the first glass substrate and the less-curved outer surface of the sidewall of the mirror casing.

21. The vehicular interior rearview mirror assembly of claim 18, wherein the first radius of curvature is at least 2.5 millimeters, and wherein the second radius of curvature is at least 2.5 millimeters.

22. A vehicular interior rearview mirror assembly, the vehicular interior rearview mirror assembly comprising:

a mirror head comprising a mirror casing and an electro-optic mirror reflective element;

a mounting assembly configured to mount at the vehicular interior rearview mirror assembly at an interior portion of a vehicle, wherein the mirror head is adjustable relative to the mounting assembly via a pivot joint;

a video display screen disposed within the mirror head behind the electro-optic mirror reflective element and operable to display video images, wherein the displayed video images are viewable through the electro-optic mirror reflective element;

wherein the mirror casing comprises a sidewall having a wall thickness spanning between an inner surface of the sidewall and an outer surface of the sidewall;

wherein the sidewall comprises an outer end region that circumscribes an open portion of the mirror casing;

wherein the electro-optic mirror reflective element is disposed at the outer end region of the sidewall at the open portion of the mirror casing;

wherein the electro-optic mirror reflective element comprises a first glass substrate and a second glass substrate;

wherein the first glass substrate has a front surface and a rear surface and a substrate thickness spanning between the front surface of the first glass substrate and the rear surface of the first glass substrate;

wherein the second glass substrate has a front surface and a rear surface and a substrate thickness spanning between the front surface of the second glass substrate and the rear surface of the second glass substrate;

wherein the rear surface of the first glass substrate has a transparent conductive coating established thereat, and wherein the front surface of the second glass substrate has a mirror reflector established thereat;

wherein an electro-optic medium is sandwiched between and contacts the transparent conductive coating of the first glass substrate and the mirror reflector of the second glass substrate, and wherein the electro-optic medium is bounded by a perimeter seal;

wherein, with the vehicular interior rearview mirror assembly mounted at the interior portion of the vehicle, the front surface of the first glass substrate is closer than the rear surface of the first glass substrate to a driver of the vehicle who is operating the vehicle; and wherein a circuit element is attached within the mirror head, and wherein the circuit element comprises a planar substrate having circuitry thereat, and wherein, with the vehicular interior rearview mirror assembly mounted at the interior portion of the vehicle, a plane of the planar substrate of the circuit element that intersects a lower portion of the mirror head and an upper portion of the mirror head is non-parallel to a plane of the rear surface of the first glass substrate.

23. The vehicular interior rearview mirror assembly of claim 22, wherein the circuit element comprises an electronic toll collection system that is operable to communicate with a transceiver of a toll road to effect payment of a toll to allow the vehicle to continue on the toll road.

24. The vehicular interior rearview mirror assembly of claim 22, wherein, with the vehicular interior rearview mirror assembly mounted at the interior portion of the vehicle, a wire harness is routed through the pivot joint to electrically connect circuitry within the mirror head to a power source of the vehicle.

25. The vehicular interior rearview mirror assembly of claim 22, wherein a first electrical connector is in electrically conductive continuity with the transparent conductive coating at the rear surface of the first glass substrate, and wherein a second electrical connector is in electrically conductive continuity with the mirror reflector at the front surface of the second glass substrate, and wherein the first electrical connector comprises (i) a connector attaching portion for attaching the first electrical connector at the electro-optic mirror reflective element and (ii) a conductor attaching portion for soldering or welding an electrical conductor to the first electrical connector, and wherein the conductor attaching portion is spaced from a plane of the connector attaching portion, and wherein an electrical conductor is electrically connected between the first electrical connector and reflectance control circuitry that is operable to vary reflectance of the electro-optic mirror reflective element.

26. The vehicular interior rearview mirror assembly of claim 22, wherein the electro-optic mirror reflective element comprises an electrochromic mirror reflective element.

27. The vehicular interior rearview mirror assembly of claim 22, wherein the interior portion of the vehicle comprises a region of a windshield of the vehicle.

28. The vehicular interior rearview mirror assembly of claim 22, wherein the first glass substrate comprises a flat region at the front surface of the first glass substrate and a rounded perimeter edge circumscribing the flat region and extending at least partially between the flat region and the rear surface of the first glass substrate, and wherein, with the vehicular interior rearview mirror assembly mounted at the interior portion of the vehicle, the rounded perimeter edge of the first glass substrate is contactable by and is viewable by the driver of the vehicle.

29. The vehicular interior rearview mirror assembly of claim 28, wherein the rounded perimeter edge of the first glass substrate has a radius of curvature of at least 2.5 mm.

30. The vehicular interior rearview mirror assembly of claim 29, wherein the substrate thickness of the first glass substrate is less than 2 mm.

31. The vehicular interior rearview mirror assembly of claim 28, wherein no portion of the mirror casing encroaches onto the rounded perimeter edge of the first glass substrate.

32. The vehicular interior rearview mirror assembly of claim 28, wherein the outer end region of the sidewall of the mirror casing comprises a rounded outer surface curving between the open portion of the mirror casing and a less-curved outer surface of the sidewall of the mirror casing.

33. The vehicular interior rearview mirror assembly of claim 32, wherein the rounded perimeter edge of the first glass substrate has a first radius of curvature, and wherein the rounded outer surface of the outer end region of the mirror casing has a second radius of curvature, and wherein the second radius of curvature matches the first radius of curvature.

34. The vehicular interior rearview mirror assembly of claim 33, wherein curvature of the rounded outer surface of the outer end region of the sidewall of the mirror casing matches curvature of the rounded perimeter edge of the first glass substrate.

35. The vehicular interior rearview mirror assembly of claim 33, wherein the rounded outer surface of the outer end region of the sidewall of the mirror casing and the rounded perimeter edge of the first glass substrate combine to provide a curved transition between the flat region at the front surface of the first glass substrate and the less-curved outer surface of the sidewall of the mirror casing.

36. The vehicular interior rearview mirror assembly of claim 33, wherein the first radius of curvature is at least 2.5 millimeters, and wherein the second radius of curvature is at least 2.5 millimeters.

37. A vehicular interior rearview mirror assembly, the vehicular interior rearview mirror assembly comprising:

a mirror head comprising a mirror casing and a mirror reflective element;

a mounting assembly configured to mount at the vehicular interior rearview mirror assembly at an interior portion of a vehicle, wherein the mirror head is adjustable relative to the mounting assembly via a pivot joint;

a video display screen disposed within the mirror head behind the mirror reflective element and operable to display video images, wherein the displayed video images are viewable through the mirror reflective element;

wherein the mirror casing comprises a sidewall having a wall thickness spanning between an inner surface of the sidewall and an outer surface of the sidewall;

wherein the sidewall comprises an outer end region that circumscribes an open portion of the mirror casing;

wherein the mirror reflective element is disposed at the outer end region of the sidewall at the open portion of the mirror casing;

wherein the mirror reflective element comprises a glass substrate, and wherein the glass substrate has a front surface and a rear surface and a substrate thickness spanning between the front surface of the glass substrate and the rear surface of the glass substrate;

wherein a mirror reflector is disposed at the rear surface of the glass substrate;

wherein, with the vehicular interior rearview mirror assembly mounted at the interior portion of the vehicle, the front surface of the glass substrate is closer than the rear surface of the glass substrate to a driver of the vehicle who is operating the vehicle; and wherein a circuit element is attached within the mirror head, and wherein the circuit element comprises a planar substrate having circuitry thereat, and wherein, with the vehicular interior rearview mirror assembly mounted at the interior portion of the vehicle, a plane of the planar substrate of the circuit element that intersects a lower portion of the mirror head and an upper portion of the mirror head is non-parallel to a plane of the rear surface of the glass substrate.

38. The vehicular interior rearview mirror assembly of claim 37, wherein the circuit element comprises an electronic toll collection system that is operable to communicate with a transceiver of a toll road to effect payment of a toll to allow the vehicle to continue on the toll road.

39. The vehicular interior rearview mirror assembly of claim 37, wherein the rear surface of the glass substrate abuts at least a portion of the open portion of the mirror casing.

40. The vehicular interior rearview mirror assembly of claim 37, wherein, with the vehicular interior rearview mirror assembly mounted at the interior portion of the vehicle, a wire harness is routed through the pivot joint to electrically connect circuitry within the mirror head to a power source of the vehicle.

41. The vehicular interior rearview mirror assembly of claim 37, wherein the interior portion of the vehicle comprises a region of a windshield of the vehicle.

42. The vehicular interior rearview mirror assembly of claim 37, wherein the glass substrate comprises a flat region at the front surface and a rounded perimeter edge circumscribing the flat region and extending at least partially between the flat region and the rear surface.

43. The vehicular interior rearview mirror assembly of claim 42, wherein, with the vehicular interior rearview mirror assembly mounted at the interior portion of the vehicle, the rounded perimeter edge of the glass substrate is contactable by and is viewable by the driver of the vehicle.

44. The vehicular interior rearview mirror assembly of claim 43, wherein the rounded perimeter edge of the glass substrate has a radius of curvature of at least 2.5 mm.

45. The vehicular interior rearview mirror assembly of claim 44, wherein the substrate thickness of the glass substrate is less than 2 mm.

46. The vehicular interior rearview mirror assembly of claim 43, wherein no portion of the mirror casing encroaches onto the rounded perimeter edge of the glass substrate.

47. The vehicular interior rearview mirror assembly of claim 43, wherein the outer end region of the sidewall of the mirror casing comprises a rounded outer surface curving between the open portion of the mirror casing and a less-curved outer surface of the sidewall of the mirror casing.

48. The vehicular interior rearview mirror assembly of claim 47, wherein the rounded perimeter edge of the glass substrate has a first radius of curvature, and wherein the rounded outer surface of the outer end region of the mirror casing has a second radius of curvature, and wherein the second radius of curvature matches the first radius of curvature.

49. The vehicular interior rearview mirror assembly of claim 48, wherein curvature of the rounded outer surface of the outer end region of the sidewall of the mirror casing matches curvature of the rounded perimeter edge of the glass substrate.

50. The vehicular interior rearview mirror assembly of claim 48, wherein the rounded outer surface of the outer end region of the sidewall of the mirror casing and the rounded perimeter edge of the glass substrate combine to provide a curved transition between the flat region at the front surface of the glass substrate and the less- curved outer surface of the sidewall of the mirror casing.

51. The vehicular interior rearview mirror assembly of claim 48, wherein the first radius of curvature is at least 2.5 millimeters, and wherein the second radius of curvature is at least 2.5 millimeters.

52. The vehicular interior rearview mirror assembly of claim 37, wherein the mirror reflective element comprises a prismatic mirror reflective element.

* * * * *